US012633251B2

(12) United States Patent
Hwang et al.

(10) Patent No.: US 12,633,251 B2
(45) Date of Patent: May 19, 2026

(54) GATE DRIVING CIRCUIT AND DISPLAY APPARATUS INCLUDING THE SAME

(71) Applicant: LG Display Co., Ltd., Seoul (KR)

(72) Inventors: Sujin Hwang, Paju-si (KR); Miyoung Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/050,967

(22) Filed: Feb. 11, 2025

(65) Prior Publication Data

US 2025/0279041 A1 Sep. 4, 2025

(30) Foreign Application Priority Data

Feb. 29, 2024 (KR) ........................ 10-2024-0029526

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01)

(58) Field of Classification Search
CPC ................... G09G 3/3266; G09G 3/32; G09G 2300/0842; G09G 2300/0426; G09G 2310/08; G09G 2310/0267; G09G 2310/0278; G09G 2320/0257
See application file for complete search history.

(56) References Cited

U.S. PATENT DOCUMENTS

2013/0038587 A1* 2/2013 Song ........................ G09G 3/20 345/204
2016/0267831 A1 9/2016 Seo et al.
2022/0375401 A1 11/2022 Kim et al.
2022/0383821 A1 12/2022 No et al.
2023/0197012 A1* 6/2023 Oh ........................ G11C 19/28 345/204
2024/0363078 A1* 10/2024 Kim ..................... G09G 3/2096

FOREIGN PATENT DOCUMENTS

KR 10-2016-0110840 A 9/2016
KR 10-2021-0076761 A 6/2021
KR 10-2022-0161602 A 12/2022

* cited by examiner

*Primary Examiner* — Muhammad N Edun
(74) *Attorney, Agent, or Firm* — Morgan, Lewis & Bockius LLP

(57) ABSTRACT

The present disclosure relates to a micro LED display apparatus, and to a display apparatus capable of stably driving a gate driver in a gate in active (GIA) circuit. According to the present disclosure, a gate driver in the GIA circuit of a display apparatus can be stably driven without the appearance of horizontal line defects.

20 Claims, 18 Drawing Sheets

GATE DRIVING CIRCUIT AND DISPLAY APPARATUS INCLUDING THE SAME

CROSS REFERENCE TO RELATED APPLICATION

The present application claims priority to Korean Patent Application No. 10-2024-0029526, filed Feb. 29, 2024, the entire contents of which are incorporated herein for all purposes by this reference.

BACKGROUND

Field

The present disclosure relates to a display apparatus, and more specifically, to a gate driving circuit and a micro LED display apparatus including the same.

Description of the Related Art

Recently, as society advances to the information-oriented society, the field of display apparatuses which visually express an electrical information signal is rapidly advancing. Various display apparatuses, having excellent performance in terms of thinness, lightness, and low power consumption, are being developed correspondingly.

Specific examples of display apparatuses include liquid crystal display apparatus (LCD), organic light emitting display Apparatus (OLED), quantum dot display apparatus, and micro light emitting display apparatus (LED) (μLED), etc.

Such a display apparatus uses a timing controller, a data driver, a gate driver circuit, and a display panel for its operation.

SUMMARY

As a display apparatus becomes thinner, a technology for embedding a gate driving circuit in a display panel is being developed. The gate driving circuit built into such a display panel is known as a gate in panel (GIP) circuit and a gate in active (GIA) circuit.

The GIA circuit of a micro LED (μLED) display apparatus is built into the display panel along with the pixel array. An object to be achieved by the present disclosure is to enable stable driving of at least one gate driver within a GIA circuit without the appearance of horizontal defects.

The objects of the present disclosure are not limited to the above-described objects, and other objects not mentioned can be clearly understood by those skilled in the art from the following description.

To achieve these objects and other advantages of the present disclosure, as embodied and broadly described herein, a micro LED display apparatus according to an embodiment may comprise a display panel on which a plurality of pixel arrays are disposed; and a gate in active (GIA) circuit which provides a scan signal to the pixel array, wherein a plurality of clock wires may be connected to the display panel, wherein the GIA circuit may comprise a first transistor to which the plurality of clock wires are connected, wherein the first transistor may be disposed along the plurality of clock wires.

A gate in active circuit may comprise or be a gate driver circuit that is arranged in an active area of a display panel and/or in an area in which a plurality of subpixels or pixel arrays are disposed.

A first direction may refer to a direction along which data lines are arranged. A second direction may refer to a direction along which gate lines or scan lines, to which subpix-els are connected, are arranged. The second direction may be perpendicular to the first direc-tion. A plurality of pixel arrays or subpixels may be arranged on the display panel.

The first transistors may be each disposed along and/or on and/or adjacent to a respective one of the plurality of clock wires to which they are connected.

The GIA circuit may further comprise a second transistor to which a forward start signal is connected, wherein the second transistor may be disposed according to the forward start signal.

The GIA circuit may further comprise a third transistor to which a reverse start signal is connected, wherein the third transistor may be disposed according to the reverse start signal.

The GIA circuit may comprise a first gate driver which provides a first scan signal to the subpixel and a second gate driver which provides a second scan signal to the subpixel.

The first gate driver and the second gate driver may further comprise a fourth transistor including a gate electrode connected to a QB node, a source electrode connected to the gate high voltage, and a drain electrode connected to the N-th scan signal, and the first transistor including a gate electrode connected to a Q node, a source electrode connected to the N-th scan signal, and a drain electrode connected to an N-th clock signal.

The first gate driver and the second gate driver may further comprise a capacitor disposed between the N-th scan signal and the Q node.

A pulse width of the second scan signal may be shorter than a pulse width of the first scan signal, and a pulse width for applying the data voltage may be longer than the pulse width of the first scan signal.

The display panel may comprise a first GIA region, a second GIA region, and a third GIA region. The first to third GIA regions may be arranged along the second direction. Each of the first to third GIA regions may comprise a plurality of the first gate drivers arranged along the first direction and a plurality of the second gate drivers arranged along the first direction.

In another aspect of the present disclosure, a display panel according to an embodiment may comprise a plurality of pixel arrays; and a gate in active (GIA) circuit which provides a scan signal to the pixel array, wherein a plurality of clock wires may be connected to the display panel, wherein the GIA circuit may comprise a first transistor to which the plurality of clock wires are connected, wherein the first transistor may be disposed along the plurality of clock wires.

The GIA circuit may further comprise a second transistor to which a forward start signal is connected, wherein the second transistor may be disposed according to the forward start signal.

The GIA circuit may further comprise a third transistor to which a reverse start signal is connected, wherein the third transistor may be disposed according to the reverse start signal.

The GIA circuit may comprise a first gate driver which provides a first scan signal to the subpixel and a second gate driver which provides a second scan signal to the subpixel.

The first gate driver and the second gate driver may further comprise a fourth transistor including a gate electrode connected to a QB node, a source electrode connected to the gate high voltage, and a drain electrode connected to the N-th scan signal, and the first transistor including a gate electrode connected to a Q node, a source electrode connected to the N-th scan signal, and a drain electrode connected to an N-th clock signal.

The first gate driver and the second gate driver may further comprise a capacitor disposed between the N-th scan signal and the Q node.

A pulse width of the second scan signal may be shorter than a pulse width of the first scan signal, and a pulse width for applying the data voltage may be longer than the pulse width of the first scan signal.

The GIA circuit may be disposed on a first GIA region, a second GIA region, and a third GIA region.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure.

DETAILED DESCRIPTION

Figure 1:
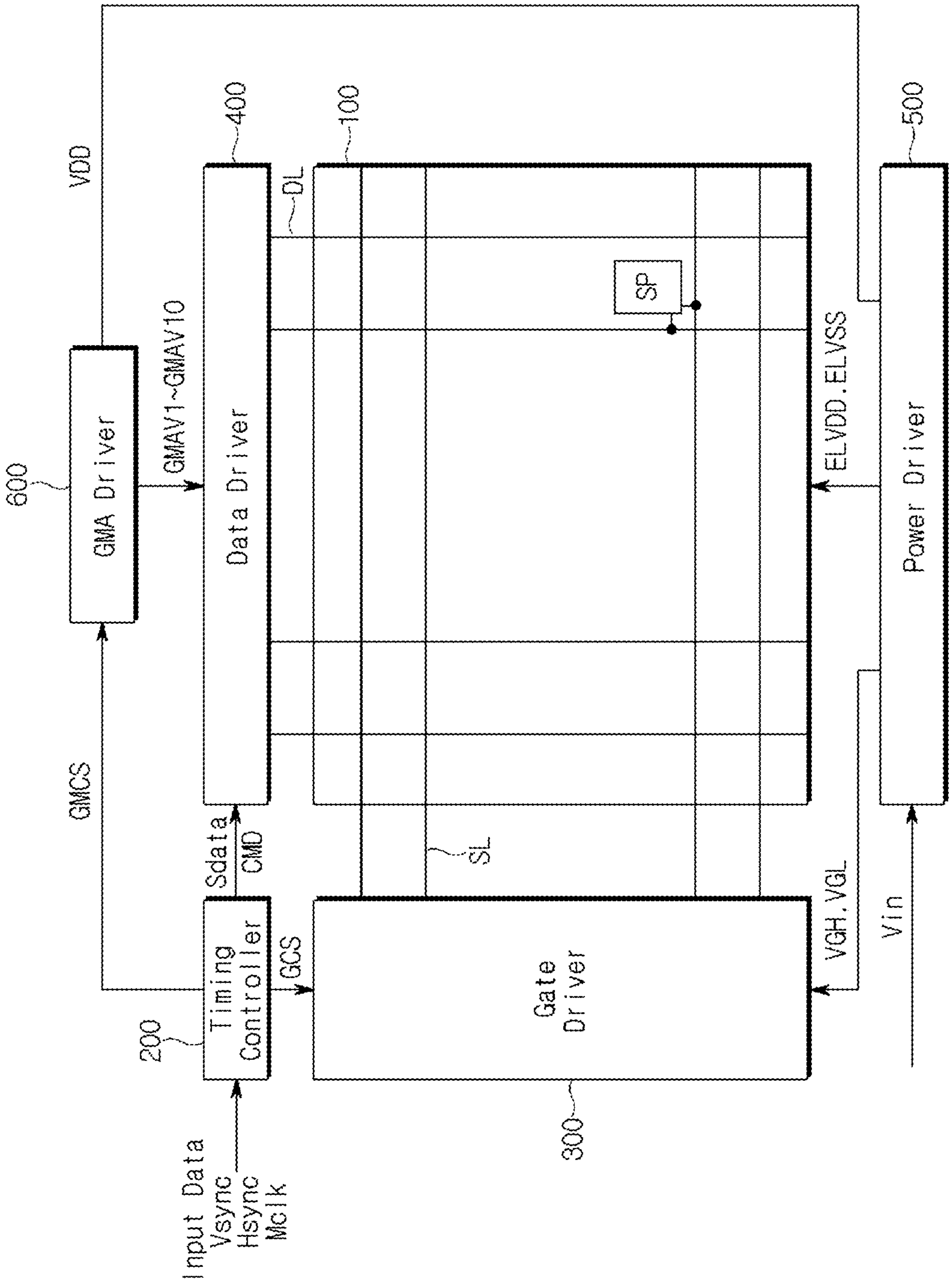
FIG. 1 is a block diagram showing a display apparatus according to embodiments of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," "include," or "done" is used, one or more other elements may be added unless the term is used with a more limiting term, such as "only" or the like. An element described in a singular form may include a plurality of elements, and vice versa, unless the context clearly indicates otherwise.

In construing an element, the element should be construed as including an error or tolerance range even where no explicit description of such an error or tolerance range is provided.

Where a positional relationship between two elements is described with such a term as "on," "above," "under," "next to," or the like, one or more other elements may be located between the two elements unless the term is used with a more limiting term, such as "immediate(ly)" or "direct(ly)."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

Hereinafter, various embodiments of the present disclosure will be described in detail with reference to the accompanying drawings. In the following embodiments, a display apparatus will be described for a micro LED (μLED), but the present disclosure is not limited thereto.

FIG. 1 is a block diagram showing a display apparatus according to embodiments of the present disclosure.

As shown in FIG. 1, a display apparatus according to embodiments of the present disclosure may include a display panel 100, a timing controller 200, a gate driver 300, a data driver 400, a power driver 500, and a gamma driver 600.

The display panel 100 includes a pixel array that displays an input image on a screen. The pixel array may include a plurality of data lines DL, a plurality of scan lines SL crossing the data lines DL, and subpixels SP arranged in a matrix form.

The display panel 100 may be implemented as a non-transmissive display panel or a transmissive display panel. The display panel 100 may be manufactured as a flexible display panel. The flexible display panel may be implemented as a micro LED (μLED) using a plastic substrate.

The timing controller 200 may receive digital image data Data of an input image and timing signals Vsync, Hsync, Clk synchronized therewith from a set system. The image data Data in digital form is a data signal of a differential signal and may be serial data. The timing signal may include a vertical synchronization signal Vsync, a horizontal synchronization signal Hsync, and a clock Clk. The set system may include a television, a monitor, a set-top box, a navigation system, a personal computer, a home theater system, a mobile device, a wearable device, a vehicle systems, etc.

The timing controller 200 may control the operation timing of the display panel 100 according to an input frequency. The input frequency may be 60 Hz in the National Television Standards Committee (NTSC) format. Recently, display apparatus that operate at a higher frequency of 120 Hz have become popular. Additionally, a display apparatus that operates at 120 Hz may be temporarily controlled to operate at 60 Hz in some cases. Additionally, recently, display apparatuses that support variable refresh rate (VRR), which operate by lowering the frame frequency to between 1 Hz and 30 Hz in a low-speed driving mode and increasing the frame frequency to 144 Hz in high-resolution video (e.g., gaming mode), are also being developed.

The timing controller 200 may output serial image data Sdata provided to the data driver 400, command data CMD for controlling the data driver 400, a gate control signal GCS for controlling the gate driver 300, and a gamma control signal GMCS for controlling the gamma driver 600, on the basis of the received timing signals Vsync, Hsync, Clk.

The gate driver 300 may be implemented as a gate driving circuit such as a Gate In Panel (GIP) circuit or a Gate In Active (GIA) circuit formed directly on the display panel 100 along with the TFT array and wiring of the pixel array. The gate driver 300 may sequentially output gate signals to the scan lines SL under the control of the timing controller 200. The gate driver 300 may sequentially output the signals to a plurality of scan lines SL by shifting the gate signal using a shift register.

The data driver 400 may use the gamma reference voltages GMAV1 to GMAV10 provided from a digital-to-analog converter (not shown) and the gamma driver 600 to convert the input image received as a digital signal from the timing controller 200 into a gamma compensation voltage in each frame period, and may output the data voltage VDATA. The data driver 400 may be implemented with multiple source drive integrated circuits. The data driver 400 may be electrically connected to the data lines DLs of the display panel 100 through a chip on glass (COG) process or tape automated bonding (TAB) process.

The power driver 500 may output direct current power required to drive the pixel array of the display panel 100 and the drivers 300, 400, and 600 using a DC-DC converter. The power driver 500 may receive a direct current input voltage Vin and generate direct current voltages such as gate high voltage VGH, gate low voltage VGL, high-potential emission voltage EVDD, low-potential emission voltage EVSS, and high-potential reference voltage VDD.

Specifically, the gate high voltage VGH is a voltage set above the threshold voltage of transistors formed in the subpixels SPs. The gate high voltage VGH is output to the gate driver 300 and may be supplied to a level shifter within the gate driver 300.

The gate low voltage VGL is a voltage lower than the threshold voltage of transistors formed in the subpixels SPs. The gate low voltage VGL may be supplied to the level shifter within the gate driver 300.

The high-potential emission voltage EVDD is a voltage supplied to the anode electrode of a light emitting device and is a positive voltage that drives the light emitting device. The high-potential emission voltage EVDD may be supplied to a high-potential power line connected to each subpixel SP within the display panel 100.

The low-potential emission voltage EVSS is a voltage supplied to the cathode electrode of a light emitting device and is a negative voltage that drives the light emitting device. The low-potential emission voltage EVSS may be supplied to a low-potential power line connected to each subpixel SP within the display panel 100.

The high-potential reference voltage VDD is a voltage output to the gamma driver 600. The high-potential reference voltage VDD may be used as a reference for generating the gamma reference voltages GMAV1 to GMAV10.

The gamma driver 600 may receive a high-potential reference voltage VDD output from the power driver 500. The gamma driver 600 may receive the gamma control signal GMCS from the timing controller 200, generate the gamma reference voltage GMAV1 to GMAV10 having a value between the high-potential reference voltage VDD and a ground voltage (0 V), and the data driver 400 may output a data voltage based on the gamma reference voltages GMAV1 to GMAV10.

Figure 2:
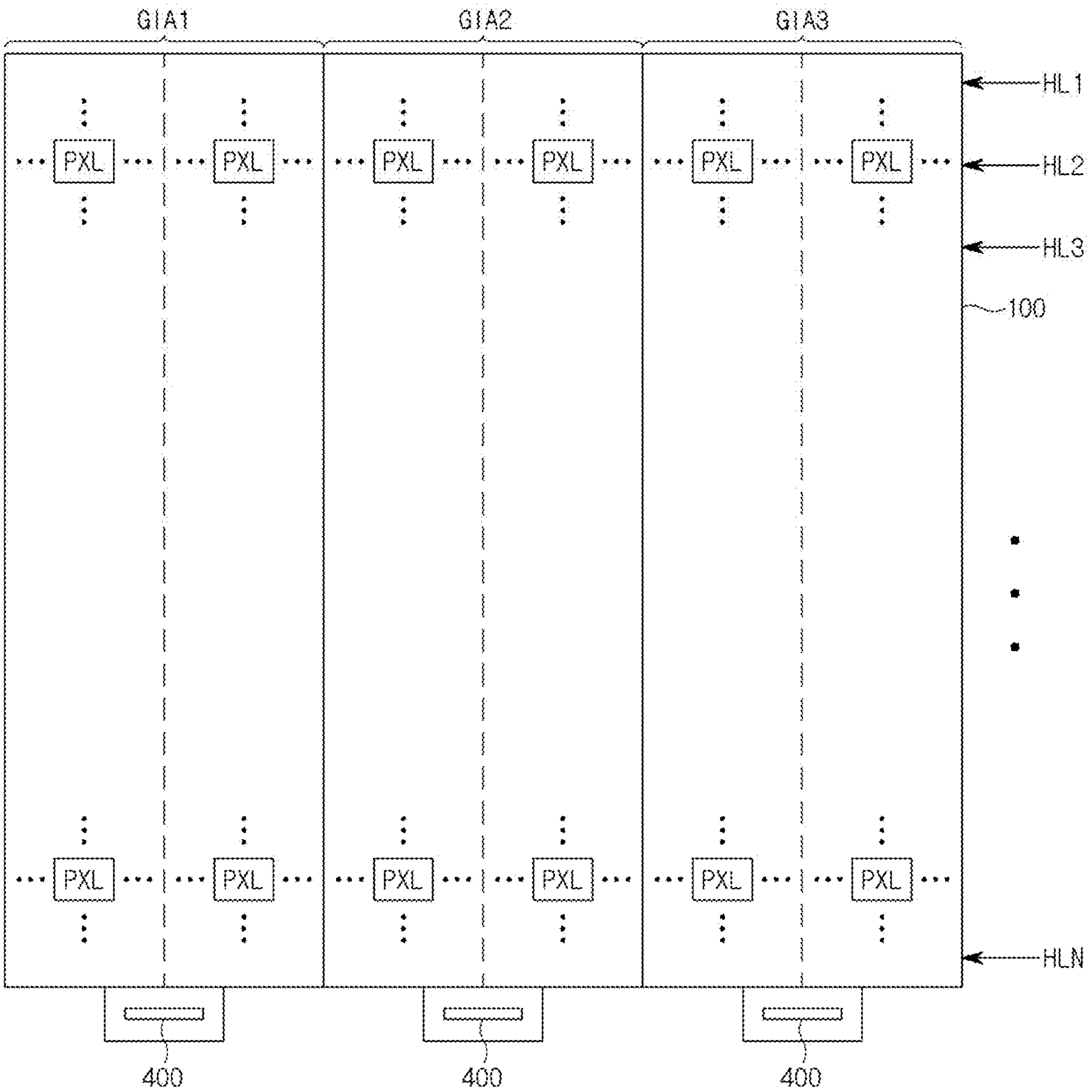
FIGS. 2, 3, and 4 are block diagrams showing a display panel according to an embodiment of the present disclosure.
Figure 3:
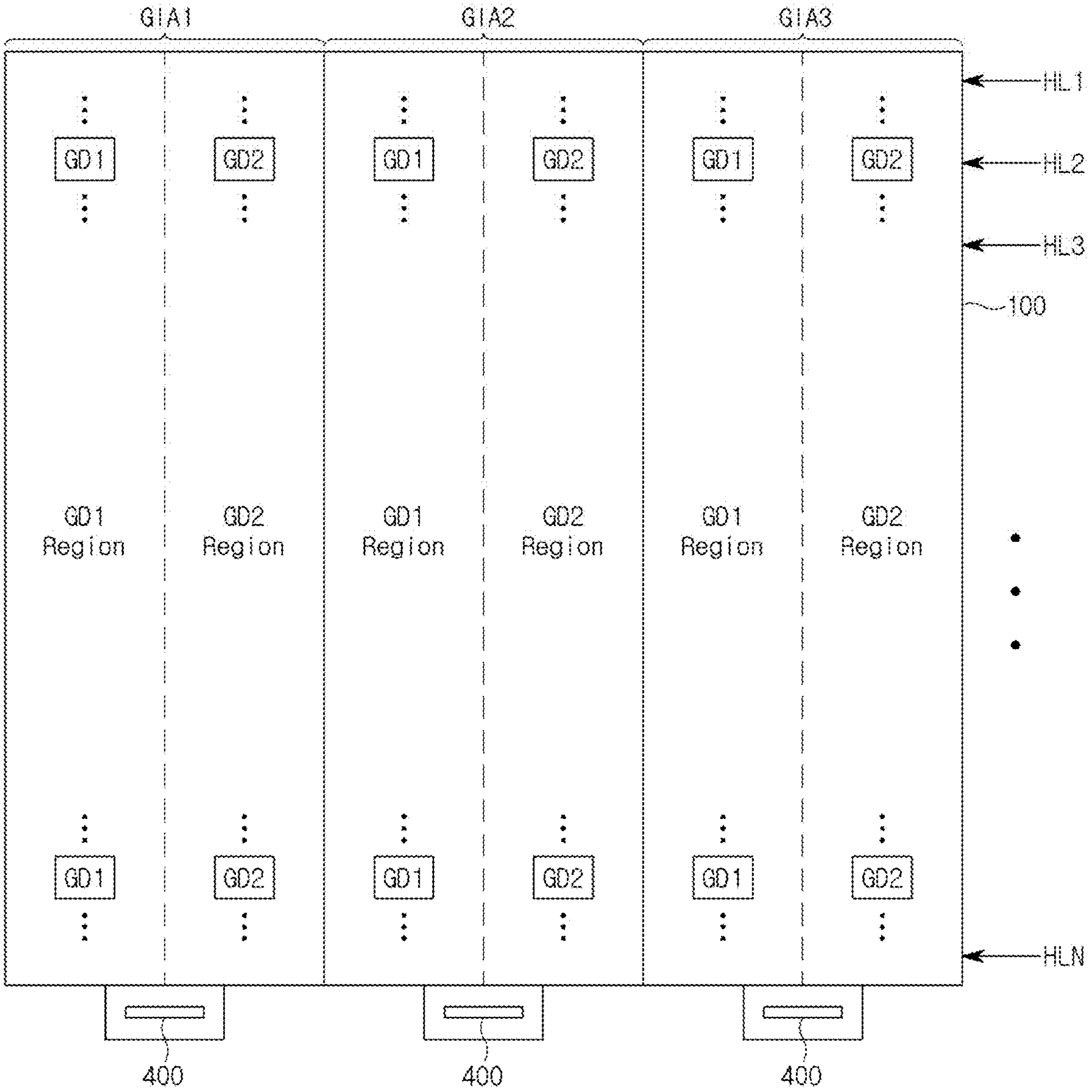
Figure 4:
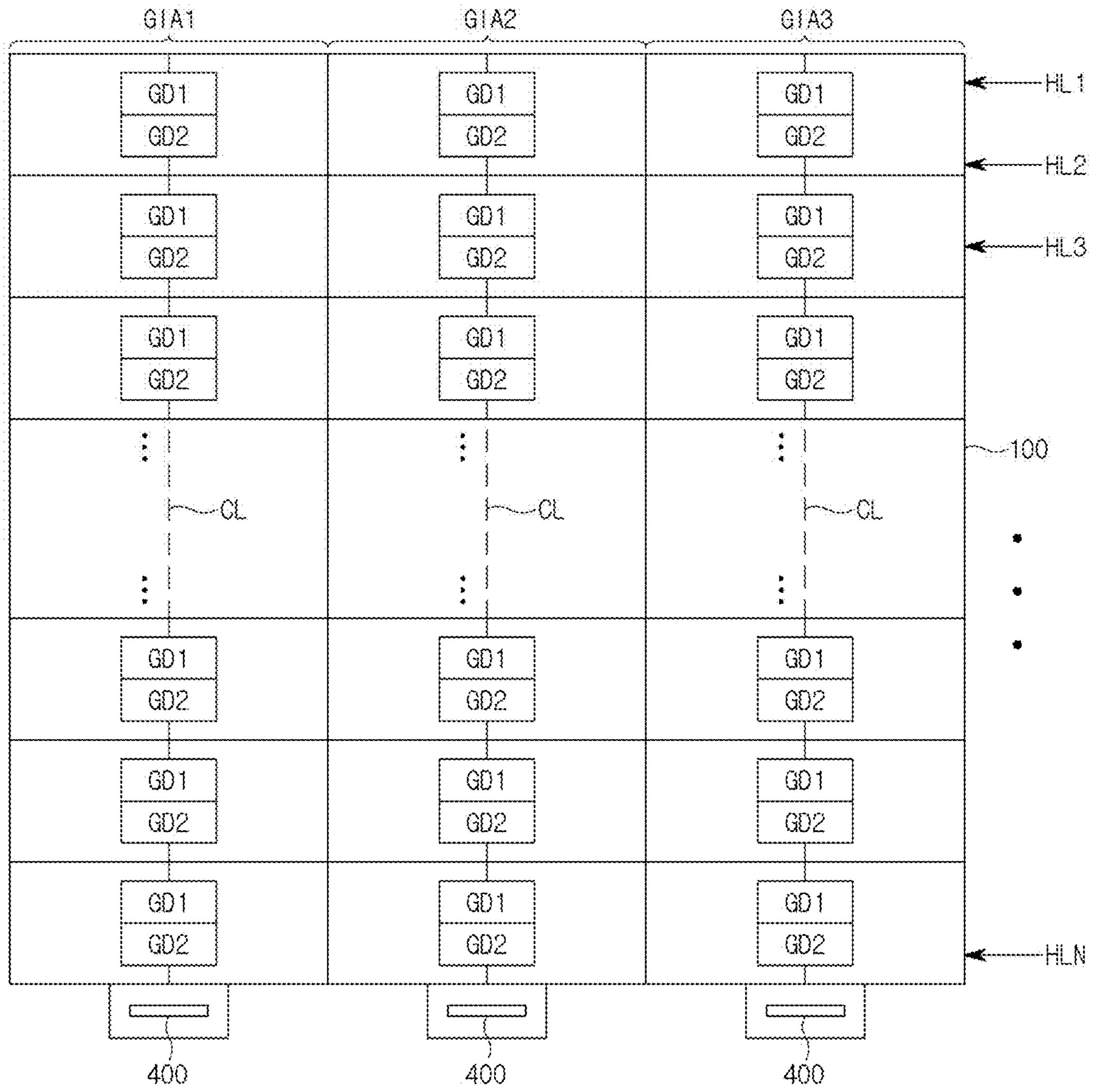

FIGS. 2, 3, and 4 are block diagrams showing a display panel according to an embodiment of the present disclosure.

As shown in FIG. 2, the display panel 100 may include a first GIA area GIA1, a second GIA area GIA2, and a third GIA area GIA3. A plurality of pixel arrays PXLs may be disposed in each of the first GIA area GIA1, the second GIA area GIA2, and the third GIA area GIA3. A plurality of data drivers 400 may be disposed at the bottom of the display panel 100, one for each of the first GIA area GIA1, the second GIA area GIA2, and the third GIA area GIA3.

For each GIA area, the data driver 400 may be disposed at the bottom of the display panel 100. The data driver 400 may supply the data voltage VDATA to a plurality of pixel arrays PXLs. Additionally, the first gate driver GD1 and second gate driver GD2 may supply the first scan signal SCAN1 and second scan signal SCAN2, respectively, to the plurality of pixel arrays PXLs in the respective GIA area.

As shown in FIGS. 3 and 4, the first GIA area GIA1, second GIA area GIA2, and third GIA area GIA3 each have a first gate driver GD1 that generates a first scan signal SCAN1 and a second gate driver GD2 that generates a second scan signal SCAN2. In other words, the GIA circuit 700 may be divided into a plurality of GIA regions GIA1, GIA2, GIA3, . . . and include a plurality of first gate drivers GD1 and second gate drivers GD2 disposed in each of the GIA regions and connected to the plurality of subpixels SP.

As shown in FIG. 3, the first gate driver GD1 may be placed on the left sides (GD1 Region) of the first GIA region GIA1, second GIA region GIA2, and third GIA region GIA3, and the second gate driver GD2 may be disposed on the right sides (GD2 Region) of the first GIA region GIA1, second GIA region GIA2, and third GIA region GIA3.

In addition, the first gate driver GD1 may be disposed on the right sides (GD2 Region) of the first GIA region GIA1, second GIA region GIA2, and third GIA region GIA3, and the second gate driver GD2 may be disposed on the left sides (GD1 Region) of the first GIA region GIA1, second GIA region GIA2, and third GIA region GIA3.

In FIG. 3, although the first gate driver GD1 and second gate driver GD2 are indicated as being disposed one for each horizontal line HL in the first region GIA1, second region GIA2, and third region GIA3, they may also be disposed across several horizontal lines HLs. The horizontal lines HLs may extend along a second direction. One horizontal line may correspond to one line of subpixels.

As shown in FIG. 4, the first gate driver GD1 and second gate driver GD2 may be disposed on the center line CL of each of the first region GIA1, second region GIA2, and third region GIA3. In FIG. 4, although the first gate driver GD1 and second gate driver GD2 are indicated as being disposed only on the center line CL of each of the first region GIA1, second region GIA2, and third region GIA3, the first gate driver GD1 and second gate driver GD2 may be partially disposed across one horizontal line HL of the first region GIA1, second region GIA2, and third region GIA3.

Figure 5:
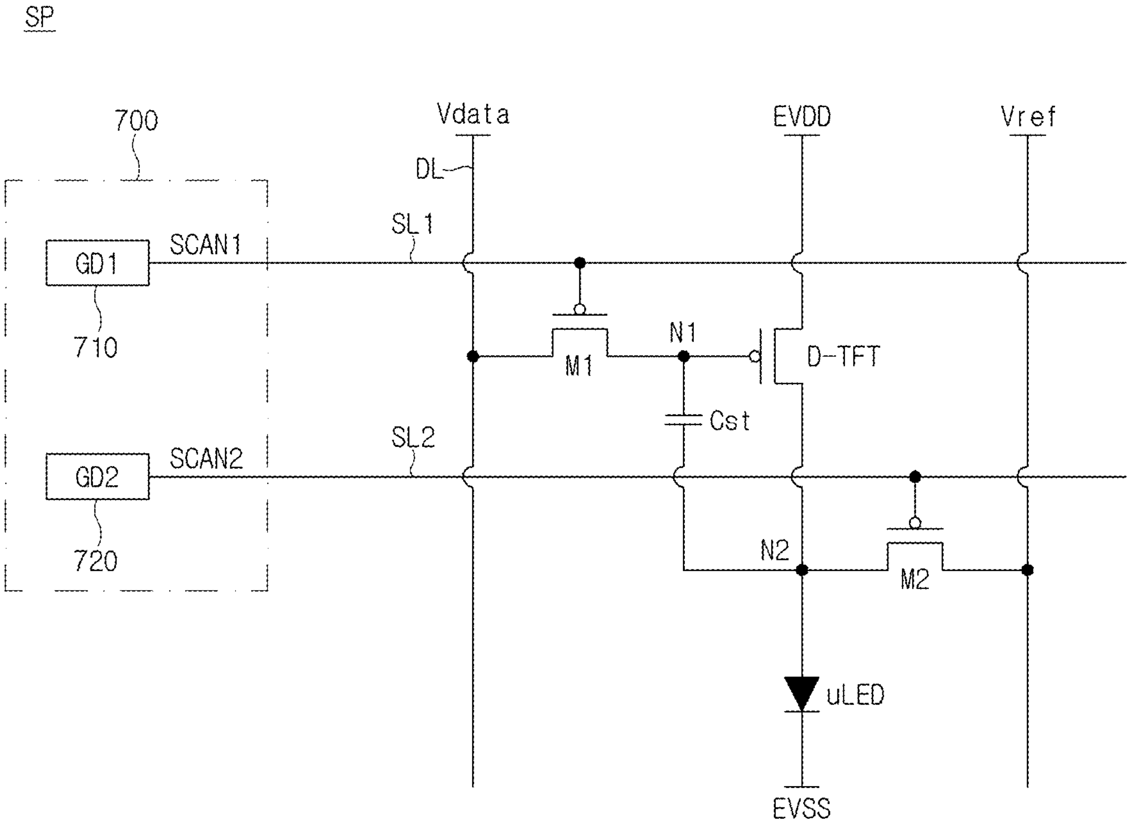
FIG. 5 is a circuit diagram showing a subpixel of a display apparatus according to embodiments of the present disclosure.

FIG. 5 is a circuit diagram showing a subpixel of a display apparatus according to embodiments of the present disclosure.

As shown in FIGS. 1 and 5, the subpixel SP may be connected to the data driver 400 through the data line DL. Additionally, the subpixel SP may be connected to the GIA circuit 700 through the first scan line SL1 and second scan line SL2. Accordingly, the subpixel SP may receive the data voltage VDATA from the data driver 400 and the first scan signal SCAN1 and second scan signal SCAN2 from the GIA circuit 700.

As shown in FIGS. 2 and 5, the plurality of pixel arrays PXLs includes the subpixel SP shown in FIG. 5, and may include some transistors of the GIA circuit 700 that provide scan signals SCAN1 and SCAN2 to the scan lines SL1 and SL2 of the subpixel SP. This is explained in more detail below with reference to FIGS. 10 and 12.

As shown in FIG. 5, the subpixel SP may include a micro LED μLED, a driving transistor D-TFT, a storage capacitor Cst, a first transistor M1, and a second transistor M2.

The micro LED μLED emits light depending on the driving current. The micro LED μLED may include an anode electrode and a cathode electrode, the drain electrode of the driving transistor D-TFT may be connected to the anode electrode, and a low-potential light emission voltage EVSS may be connected to the cathode electrode.

The driving transistor D-TFT is coupled between the micro LED μLED and the high-potential light emission voltage EVSS, and may control the driving current to emit the micro LED μLED according to the data voltage VDATA applied to the gate electrode. The driving transistor D-TFT may include a source electrode, a gate electrode, and a drain electrode. The gate electrode of the driving transistor D-TFT corresponds to a first node N1, and the drain electrode corresponds to the second node N2. The high-potential emission voltage EVDD may be connected to the source electrode of the driving transistor D-TFT.

The storage capacitor Cst may be connected between the gate electrode and drain electrode of the driving transistor D-TFT. The storage capacitor Cst may sample the data voltage VDATA when the first transistor M1 is turned on and may boost the gate electrode of the driving transistor D-TFT.

The first transistor M1 may be connected between the data line DL and the gate electrode of the driving transistor D-TFT. Additionally, the first transistor M1 may be connected between the data line DL and one electrode of the storage capacitor Cst.

The data voltage VDATA is applied to the data line DL, and the first transistor M1 may transmit the data voltage VDATA to the first node N1 in response to the first scan signal SCAN1 applied through the first scan line SL1.

The second transistor M2 is connected between the power line to which the reference voltage VREF is applied and the second node N2. The second transistor M2 may pre-charge the second node N2 with the reference voltage VREF in response to the second scan signal SCAN2 applied through the second scan line SL2.

Depending on the embodiment, the driving transistor D-TFT, the first transistor M1, and the second transistor M2 may be implemented as a low temperature polycrystalline oxide (LTPS) transistor or an oxide semiconductor transistor, but are not limited thereto. For example, the driving transistor D-TFT, the first transistor M1, and the second transistor M2 may be constituted with a P-type oxide thin film transistor or N-type oxide thin film transistor.

The subpixel SP according to an embodiment of the present disclosure is not limited thereto, and may include a transistor and a capacitor in addition to the micro LED μLED, the driving transistor D-TFT, and the storage capacitor Cst. In addition, some transistors of the GIA circuit 700 may be included between the plurality of subpixels SPs.

Figure 6:
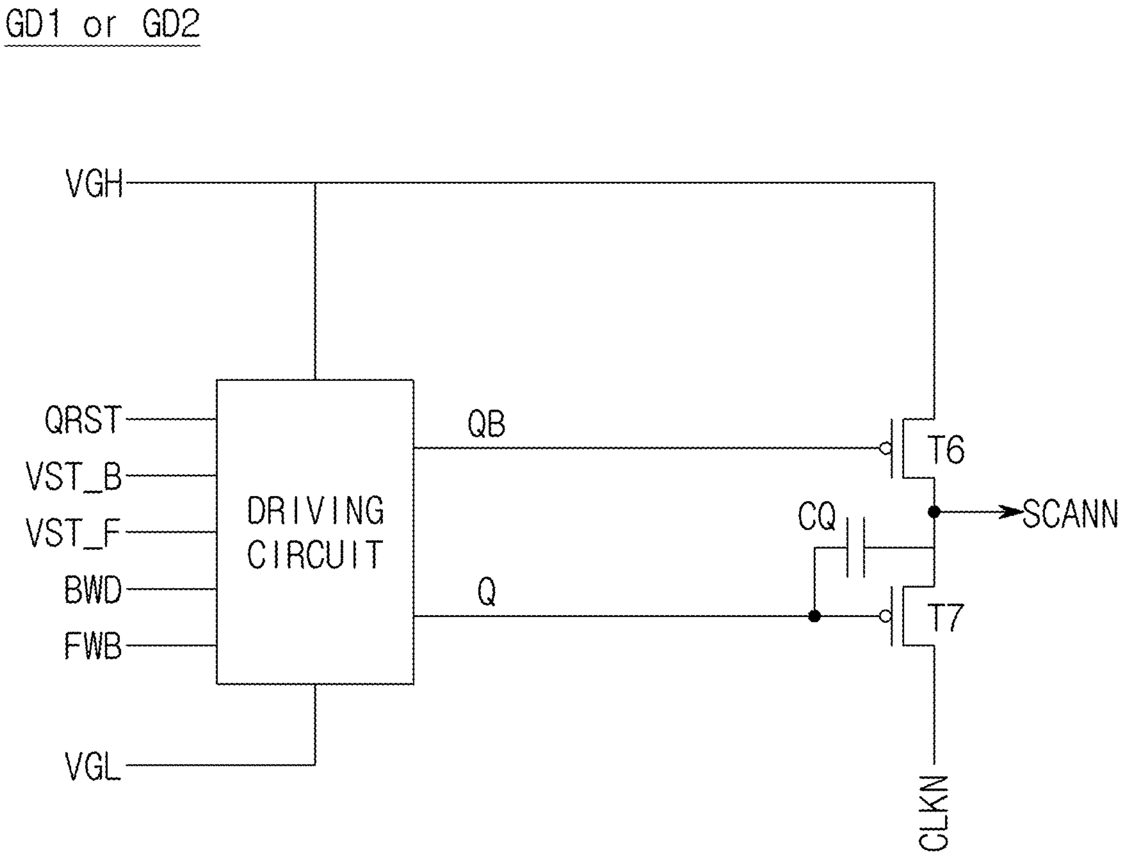
FIG. 6 is a block diagram showing a gate driver according to an embodiment of the present disclosure.

FIG. 6 is a block diagram showing a gate driver according to an embodiment of the present disclosure.

As shown in FIGS. 5 and 6, the GIA circuit 700 may include two gate drivers GDs, a first gate driver GD1 and a second gate driver GD2.

The gate driver may be the first gate driver GD1 that generates the first scan signal SCAN1 or the second gate driver GD2 that generates the second scan signal SCAN2.

As shown in FIGS. 5 and 6, the first gate driver GD1 may generate a first scan signal SCAN1, and provide the first scan signal SCAN1 to the first transistor M1 of the subpixel SP. The first transistor M1 may provide the data voltage VDATA to the subpixel SP in response to the first scan signal SCAN1. Additionally, the second gate driver GD2 may generate a second scan signal SCAN2 and provide the second scan signal SCAN2 to the second transistor M2 of the subpixel SP. The second transistor M2 may provide a reference voltage VREF to the second node N2 in response to the second scan signal SCAN2.

As shown in FIG. 6, the gate driver GD may include a driving circuit DRIVING CIRCUIT, a transistor T6, and a transistor T7.

The driving circuit DRIVING CIRCUIT may charge or discharge the QB node or Q node using at least one of the gate high voltage VGH, gate low voltage VGL, front-stage voltage FWD, and rear-stage voltage BWD, in response to at least one of a global reset signal QRST, a forward start signal VST_F, and a reverse start signal VST_B.

The gate high voltage VGH may be connected to the source electrode of the transistor T6, and the N-th scan signal SCANN may be connected to the drain electrode. Additionally, a QB node may be connected to the gate electrode of the transistor T6. The transistor T6 may pull-up drive the N-th scan signal SCANN according to the signal of the QB node.

The N-th scan signal SCANN may be connected to the source electrode of the transistor T7, and the N-th clock signal CLKN may be connected to the drain electrode. Additionally, a Q node may be connected to the gate electrode of the transistor T7. The transistor T7 may pull-down drive the N-th scan signal SCANN according to the signal of the Q node.

Figure 7:
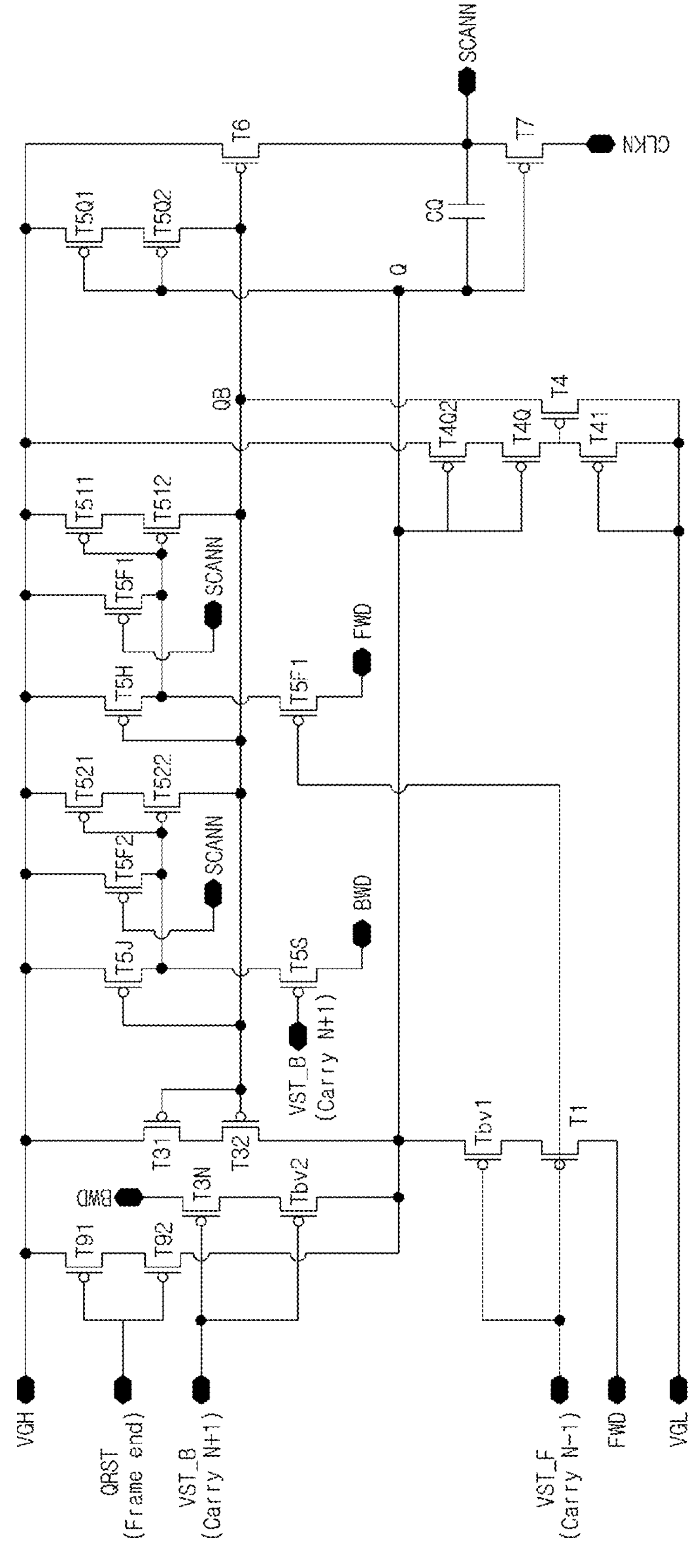
FIG. 7 is a circuit diagram showing a gate driver according to an embodiment of the present disclosure.

FIG. 7 is a circuit diagram showing a gate driver according to an embodiment of the present disclosure.

The gate driver may include a plurality of stage circuits, and each of the plurality of stage circuits may be configured as a circuit as shown in FIG. 7. The gate driver GD may be the first gate driver GD1 or the second gate driver GD2.

As shown in FIG. 7, the gate drivers GD1 and GD2 may include the transistor T6 and the transistor T7. In the transistor T6, the gate high voltage VGH is connected to the source electrode, the N-th scan signal SCANN is connected to the drain electrode, and the QB node is connected to the gate electrode. The transistor T6 may pull-up drive the N-th scan signal SCANN in response to the signal from the QB node. Here N may be 1 or 2.

In the transistor T7, the N-th scan signal SCANN is connected to the source electrode, the N-th clock signal CLKN is connected to the drain electrode, and the Q node is connected to the gate electrode. The transistor T7 may pull-down drive the N-th scan signal SCANN according to the N-th scan signal SCANN in response to the signal of the Q node. Here N may be 1 or 2.

The gate drivers GD1 and GD2 may further include a transistor T91, a transistor T92, and a transistor Tbv3. The transistors T91 and T92 may apply the gate high voltage VGH to the transistor Tbv3 according to the global reset signal QRST. The global reset signal QRST may be applied at each end of frame of an image to initialize the Q node to the gate high voltage VGH. The transistor Tbv3 may apply the gate high voltage VGH to the Q node according to the gate low voltage VGL.

As shown in FIGS. 3 and 7, the gate drivers GD1 and GD2 may further include a transistor T1 and a transistor Tbv1. When the gate drivers GD1 and GD2 are located at a first horizontal line HL1, the transistor T1 may transfer the front-stage voltage FWD to the transistor Tbv1 in response to the forward start signal VST_F. The transistor Tbv1 may apply the front-stage voltage FWD to the Q node according to the gate low voltage VGL. Here, the front-stage voltage FWD may be set to the same level as the gate low voltage VGL.

The transistor T1 and transistor Tbv1 may discharge the Q node to the front-stage voltage FWD during forward operation. In this case, the transistor T7 may pull-down drive the N-th scan signal SCANN according to the N-th clock signal CLKN by discharging the Q node. Here, the forward operation may be defined as sequential driving in the order from the first horizontal line HL 1 to the N-th horizontal line HL N.

When the gate drivers GD1 and GD2 are located at the second horizontal line HL 2 to the N-th horizontal line HL N, the transistor T1 may transfer the front-stage voltage FWD to the transistor Tbv1 according to the N−1 carry signal Carry N−1. Here, the (N−1)-th carry signal Carry N−1 may be a signal output from the previous horizontal line HL in a forward direction.

In addition, the gate drivers GD1 and GD2 may further include a transistor T3N and a transistor Tbv2. When the gate drivers GD1 and GD2 are located at the first horizontal line HL1, the transistor T3N may transfer the rear-stage voltage BWD to the transistor Tbv2 according to the reverse start signal VST_B. The transistor Tbv2 may transfer the rear-stage voltage BWD to the Q node according to the gate low voltage VGL. Here, the rear-stage voltage BWD may be set to the same level as the gate high voltage VGH.

When operating in the reverse direction, the transistors T3N and Tbv2 may charge the Q node with the rear-stage voltage BWD. In this case, the transistor T7 may pull-up drive the N-th scan signal SCANN according to the N-th clock signal CLKN by charging the Q node. Here, the reverse operation may be defined as sequential driving in the order from the N-th horizontal line HL N to the first horizontal line HL 1.

In a reverse operation, when the gate drivers GD1 and GD2 are reversely located at the (N−1)-th horizontal line HL N−1 to the first horizontal line HL 1, the transistor T3N may transfer the rear-stage voltage BWD to the transistor Tbv2 according to the (N+1)-th carry signal Carry N+1. Here, the (N+1)-th carry signal Carry N+1 may be a signal output from the previous stage circuit in a reverse direction.

In addition, the gate drivers GD1 and GD2 may further include transistors T31 and T32 and a transistor Tbv4. The transistors T31 and T32 may apply the gate high voltage VGH to the transistor Tbv4 according to the signal of the QB node. The transistor Tbv4 may apply the gate high voltage VGH to the Q node according to the gate low voltage VGL.

The transistors T31 and T32 and the transistor Tbv4 may turn off the transistor T7 by transferring the gate high voltage VGH to the Q node while the transistor T6 is turned on due to the discharge of the QB node.

In addition, the gate drivers GD1 and GD2 may further include transistors T4 and T41, a transistor T4Q, and a transistor Tbv6. When the Q node is charged, the transistors T4 and T41 may turn on the transistor T6 by applying the gate low voltage VGL to the QB node according to the gate low voltage VGL.

While the transistor T7 is turned on due to the discharge of the Q node and applies the N-th clock signal CLKN to the N-th scan signal SCANN, the transistor T4Q and transistor Tbv6 may turn off the transistor T6 to prevent the QB node from discharging.

In addition, the gate drivers GD1 and GD2 may further include a transistor T5S, transistors T511, T512, and transistor T5H. During the forward operation, the transistor T5S, transistors T511, T512, and transistor T5H may control the signal of the QB node during the forward operation.

During the forward operation, the transistor T5S may apply the front-stage voltage FWD to the transistors T511 and T512 according to the forward start signal VST_F or (N−1)-th carry signal Carry N−1.

The transistors T511, T512 may apply the gate high voltage VGH to the QB node according to the front-stage voltage FWD, and the transistor T5H may turn off the transistors T511, T512 according to the signal of the QB node.

In addition, the gate drivers GD1 and GD2 may further include a transistor T5N, transistors T521, T522, and transistor T5J. The transistor T5N, transistors T521, T522, and transistor T5J may control the signal of the QB node during the reverse operation.

During the reverse operation, the transistor T5N may apply the rear-stage voltage BWD to the transistors T521 and T522 according to the reverse start signal VST_B or (N+1)-th carry signal Carry N+1.

The transistors T521, T522 may apply the gate high voltage VGH to the QB node according to the rear-stage voltage BWD, and the transistor T5J may turn off the transistors T521, T522 according to the signal of the QB node.

In addition, the gate drivers GD1 and GD2 may further include transistors T5Q1 and T5Q2 and a transistor Tbv5. The transistor Tbv5 may transfer the signal of the Q node to the transistors T5Q1 and T5Q2 according to the gate low voltage VGL. The transistors T5Q1 and T5Q2 may apply the gate high voltage VGH to the QB node in response to the signal of the Q node.

While the transistor T7 applies the N-th clock signal CLKN to the N-th scan signal SCANN due to the discharge of the Q node, the transistors T5Q1 and T5Q2 and the transistor Tbv5 may turn off the transistor T6 by applying the gate high voltage VGH to the QB node.

In addition, the gate drivers GD1 and GD2 may further include a stabilization capacitor CQ. The stabilization capacitor CQ is connected between the N-th scan signal SCANN and the Q node to stabilize the voltage level when the N-th scan signal SCANN is output.

Figure 8:
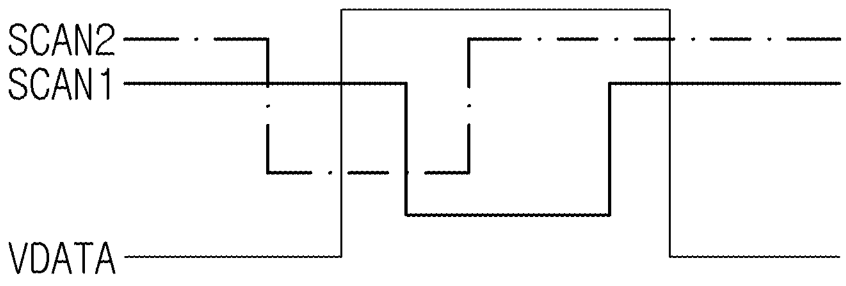
FIG. 8 is a timing diagram of a subpixel according to an embodiment of the present disclosure.

FIG. 8 is a timing diagram of a subpixel according to an embodiment of the present disclosure.

As shown in FIGS. 5 and 8, the subpixel SP first receives the second scan signal SCAN2 from the second gate driver GD2. In this case, the second transistor M2 of the subpixel SP may apply the reference voltage VREF to the second node N2 according to the second scan signal SCAN2. Next, the subpixel SP receives the data voltage VDATA from the data driver 400.

Thereafter, the subpixel SP receives the first scan signal SCAN1 from the first gate driver GD1. In this case, the first transistor M1 of the subpixel SP may apply the data voltage VDATA to the first node N1 according to the first scan signal SCAN1.

As a result, the storage capacitor Cst of the subpixel SP samples the data voltage VDATA, and the driving transistor D-TFT supplies a driving current corresponding to the voltage of the first node N1 to the micro LED μLED to make the micro LED μLED to emit light.

As shown in FIG. 8, the pulse width of the second scan signal SCAN2 may be set shorter than the pulse width of the first scan signal SCAN1, and the pulse width for applying the data voltage VDATA may be set to be longer than the pulse width of the first scan signal SCAN1.

Figure 9:
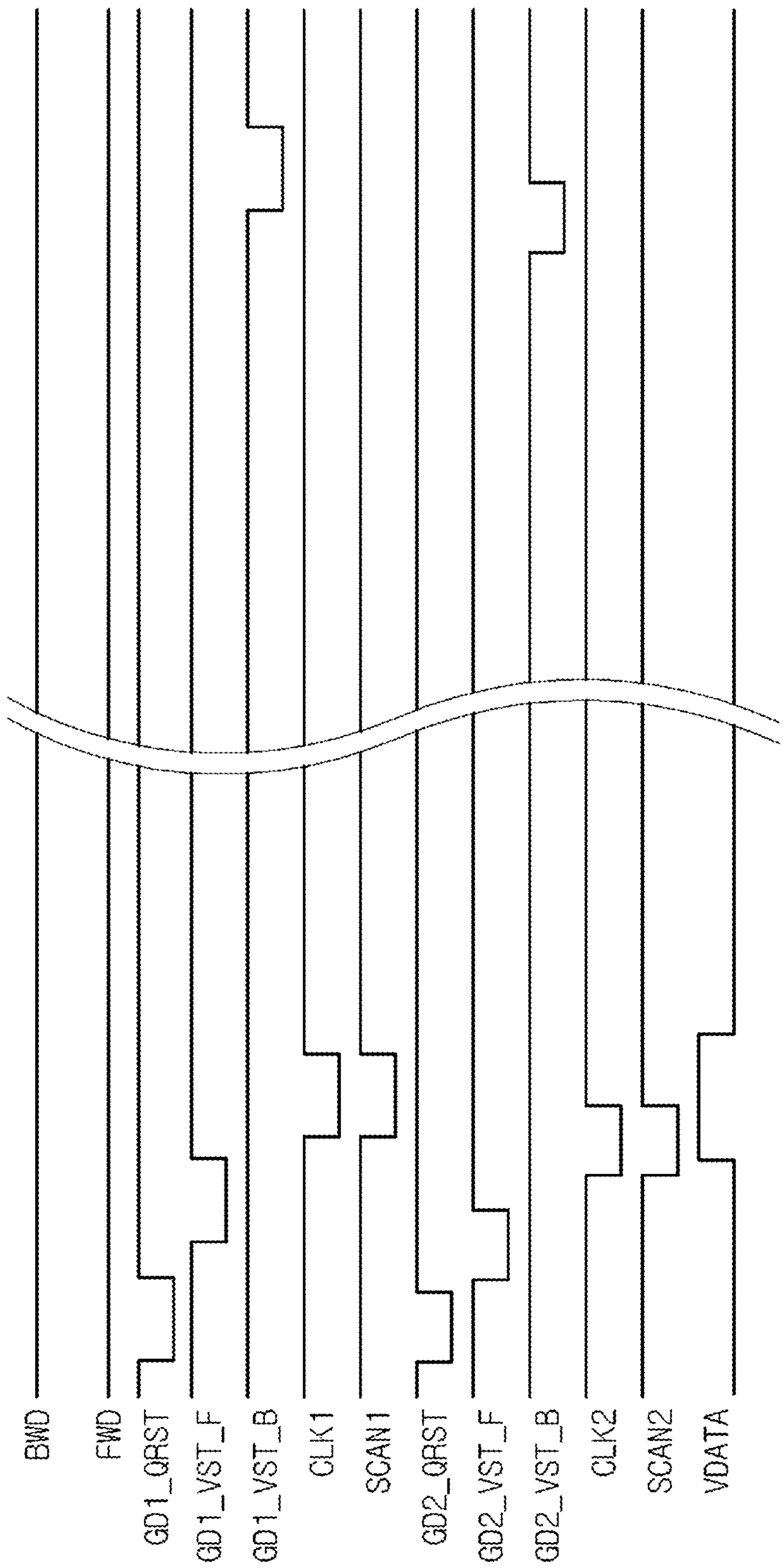
FIG. 9 is a timing diagram of a gate driver according to an embodiment of the present disclosure.

FIG. 9 is a timing diagram of a gate driver according to an embodiment of the present disclosure.

As shown in FIG. 9, during the forward operation, the front-stage voltage FWD may be set to the same level as the gate high voltage VGH, and the rear-stage voltage BWD may be set to the same level as the gate low voltage VGL.

The first gate driver GD1 may first initialize the QB node to the gate low voltage VGL and the Q node to the gate high voltage VGH according to a first global reset signal GD1_QRST.

Next, the first gate driver GD1 may start driving by charging the QB node with the front-stage voltage FWD and discharging the Q node to the rear-stage voltage BWD according to a first forward start signal GD1_VST_F. In this case, the first gate driver GD1 may output the first scan signal SCAN1 to the first scan line SL1 of the display panel 100 according to the first clock signal CLK1.

Lastly, the first gate driver GD1 may terminate the driving by discharging the QB node to the rear-stage voltage BWD and charging the Q node with the front-stage voltage FWD in response to the first reverse start signal GD1_VST_B.

The second gate driver GD2 may first initialize the QB node to the gate low voltage VGL and the Q node to the gate high voltage VGH according to a second global reset signal GD2_QRST.

Next, the second gate driver GD2 may start driving by charging the QB node with the front-stage voltage FWD and discharging the Q node to the rear-stage voltage BWD according to a second forward start signal GD2_VST_F. In this case, the second gate driver GD2 may output the second scan signal SCAN2 to the second scan line SL2 of the display panel 100 according to the second clock signal CLK2.

Lastly, the second gate driver GD2 may terminate the driving by discharging the QB node to the rear-stage voltage BWD and charging the Q node with the front-stage voltage FWD in response to a second reverse start signal GD2_VST_B.

Figure 10:
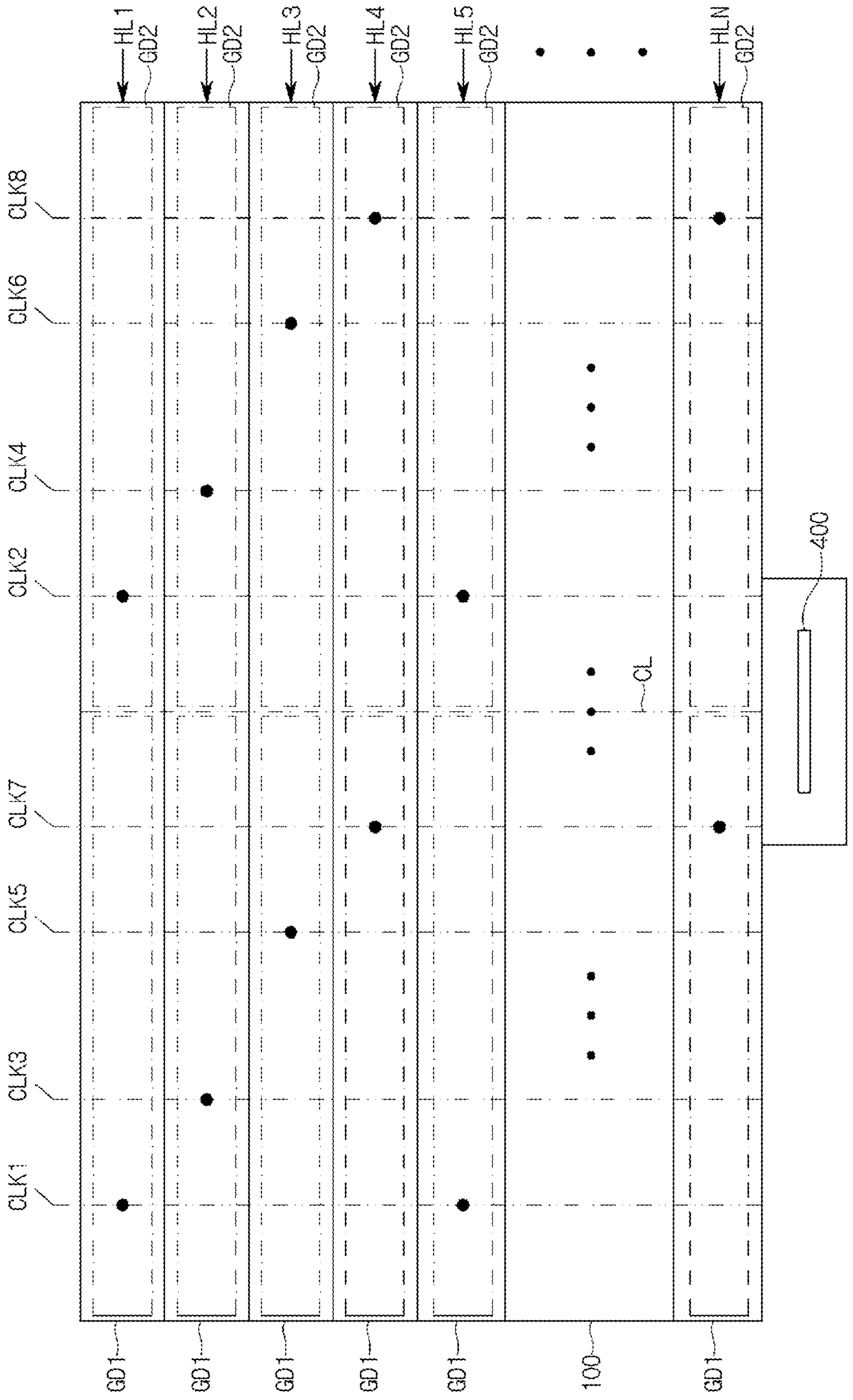
FIG. 10 is a layout diagram showing a clock signal and gate driver according to an embodiment of the present disclosure.

FIG. 10 is a layout diagram showing a clock signal and gate driver according to an embodiment of the present disclosure.

As shown in FIG. 10, the first gate driver GD1 and second gate driver GD2 may be disposed on the left and right sides of the center line CL of the display panel 100, respectively, in one horizontal line HL. The horizontal lines HLs may extend along a second direction. One horizontal line may cor-respond to one line of subpixels.

The first clock signal (line or wire) CLK1 to the eighth clock signal (line or wire) CLK8 may be disposed in the order of first clock signal CLK1, the third clock signal CLK3, the fifth clock signal CLK5, the seventh clock signal CLK7, the second clock signal CLK2, the fourth clock signal CLK4, the sixth clock signal CLK6, and the eighth clock signal CLK8, respectively. The respective clock signal wires (or lines) may be arranged and/or may extend in parallel to the data lines.

The first clock signal CLK1, third clock signal CLK3, fifth clock signal CLK5, and seventh clock signal CLK7 may be supplied to the left side of the center line CL of the display panel 100. For example, the first clock signal CLK1 may be supplied to the first gate driver GD1 of the first horizontal line HL1, the third clock signal CLK3 may be supplied to the first gate driver GD1 of the second horizontal line HL2, the fifth clock signal CLK5 may be supplied to the first gate driver GD1 of the third horizontal line HL3, and the seventh clock signal CLK7 may be supplied to the first gate driver GD1 of the fourth horizontal line HL4.

The first clock signal CLK1, third clock signal CLK3, fifth clock signal CLK5, and seventh clock signal CLK7 may be periodically supplied to the first gate driver GD1 for each of the four horizontal lines HLs. For example, the first clock signal CLK1 may be supplied to the first gate line GD1 of the first horizontal line HL1 and fifth horizontal line HL5.

In addition, the second clock signal CLK2, fourth clock signal CLK4, sixth clock signal CLK6, and eighth clock signal CLK8 may be supplied to the right side of the center line CL of the display panel 100. For example, the second clock signal CLK2 may be supplied to the second gate driver GD2 of the first horizontal line HL1, the fourth clock signal CLK4 may be supplied to the second gate driver GD2 of the second horizontal line HL2, the sixth clock signal CLK6 may be supplied to the second gate driver GD2 of the third horizontal line HL3, and the eighth clock signal CLK8 may be supplied to the second gate driver GD2 of the fourth horizontal line HL4.

The second clock signal CLK2, fourth clock signal CLK4, sixth clock signal CLK6, and eighth clock signal CLK8 may be periodically supplied to the second gate driver GD2 for each of the four horizontal lines HLs. For example, the second clock signal CLK2 may be supplied to the second gate line GD2 of the first horizontal line HL1 and fifth horizontal line HL5.

Figure 11:
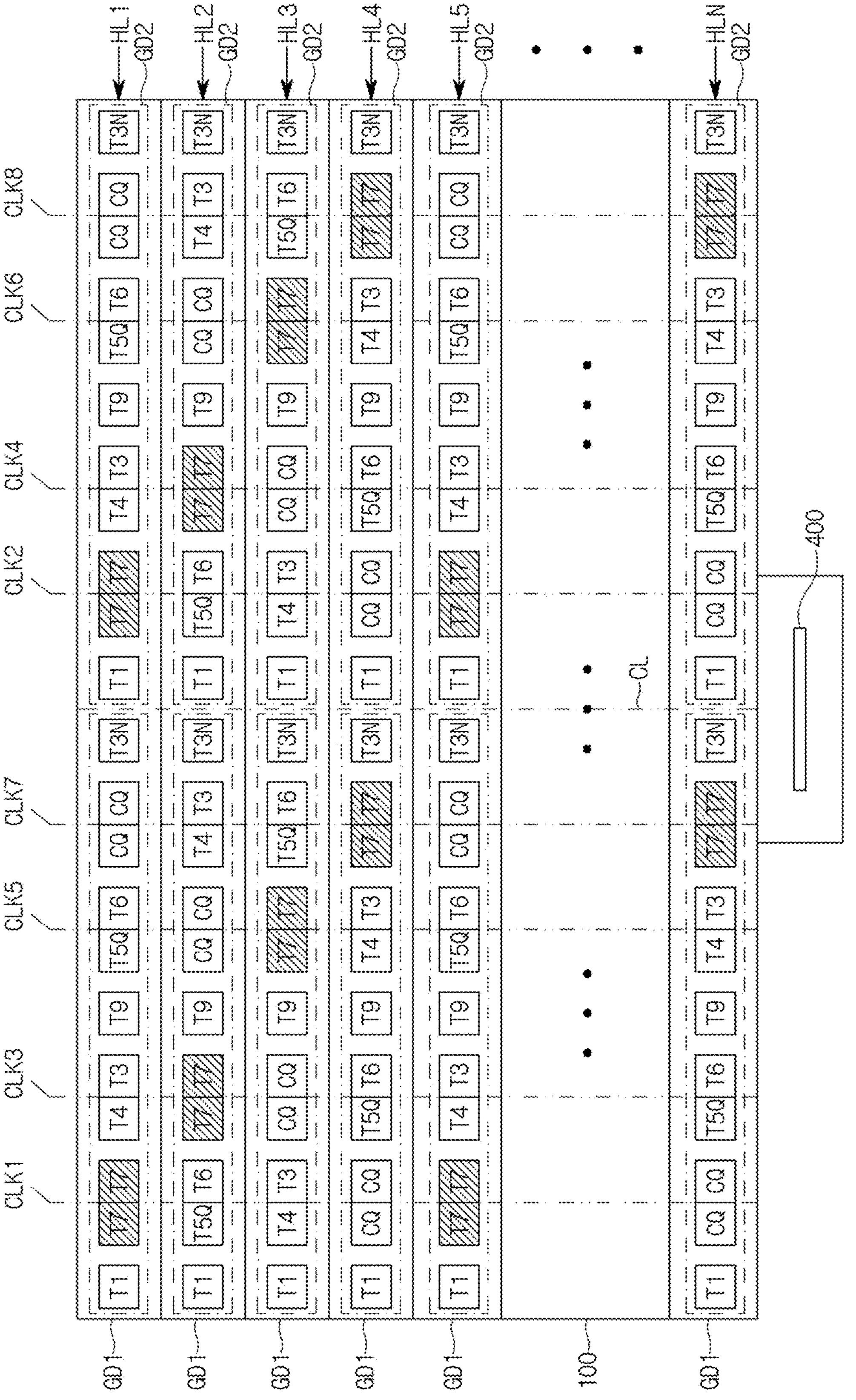
FIG. 11 is a layout diagram showing transistors of a gate driver according to an embodiment of the present disclosure.

FIG. 11 is a layout diagram showing transistors of a gate driver according to an embodiment of the present disclosure.

As shown in FIGS. 7 and 11, in the first horizontal line HL1, the first gate driver GD1 and second gate driver GD2 may be disposed in the order of a transistor T1, a transistor T7, a transistor T4, a transistor T3, a transistor T9, a transistor T5Q, a transistor T6, a transistor CQ, and a transistor T3N, respectively.

In the second horizontal line HL2, the first gate driver GD1 and second gate driver GD2 may be disposed in the order of the transistor T1, the transistor T4, the transistor T3, the transistor T7, the transistor T9, the transistor CQ, the transistor T5Q, the transistor T6, and the transistor T3N, respectively.

In the third horizontal line HL3, the first gate driver GD1 and second gate driver GD2 may be disposed in the order of the transistor T1, the transistor T5Q, the transistor T6, the transistor CQ, the transistor T9, the transistor T7, the transistor T4, the transistor T3, and the transistor T3N, respectively.

In the fourth horizontal line HL4, the first gate driver GD1 and second gate driver GD2 may be disposed in the order of the transistor T1, the transistor CQ, the transistor T5Q, the transistor T6, the transistor T9, the transistor T4, the transistor T3, the transistor T7, and the transistor T3N, respectively.

The arrangement order of the transistors of the first gate driver GD1 and second gate driver GD2 may be repeated in a period of four horizontal lines HLs.

As shown in FIGS. 7 and 11, the transistor T7 of the first gate driver GD1 may receive the first clock signal CLK1 at the first horizontal line HL1 and generate the first scan signal SCAN1. In addition, the transistor T7 of the second gate driver GD2 may receive the second clock signal CLK2 at the first horizontal line HL1 and generate the second scan signal SCAN2.

The transistor T7 of the first gate driver GD1 may receive the third clock signal CLK3 at the second horizontal line HL2 and generate the third scan signal SCAN3. In addition, the transistor T7 of the second gate driver GD2 may receive the fourth clock signal CLK4 at the second horizontal line HL2 and generate the fourth scan signal SCAN4.

The transistor T7 of the first gate driver GD1 may receive the fifth clock signal CLK5 at the third horizontal line HL3 and generate the fifth scan signal SCAN5. In addition, the transistor T7 of the second gate driver GD2 may receive the sixth clock signal CLK6 at the third horizontal line HL3 and generate the sixth scan signal SCAN6.

The transistor T7 of the first gate driver GD1 may receive the seventh clock signal CLK7 at the fourth horizontal line HL4 and generate the seventh scan signal SCAN7. In addition, the transistor T7 of the second gate driver GD2 may receive the eighth clock signal CLK8 at the fourth horizontal line HL4 and generate the eighth scan signal SCAN8.

The clock signal CLK received by the transistor T7 of the first and second gate drivers GD1 and GD2 on the horizontal line HL may be repeated in a period of four horizontal lines HLs.

Figure 12:
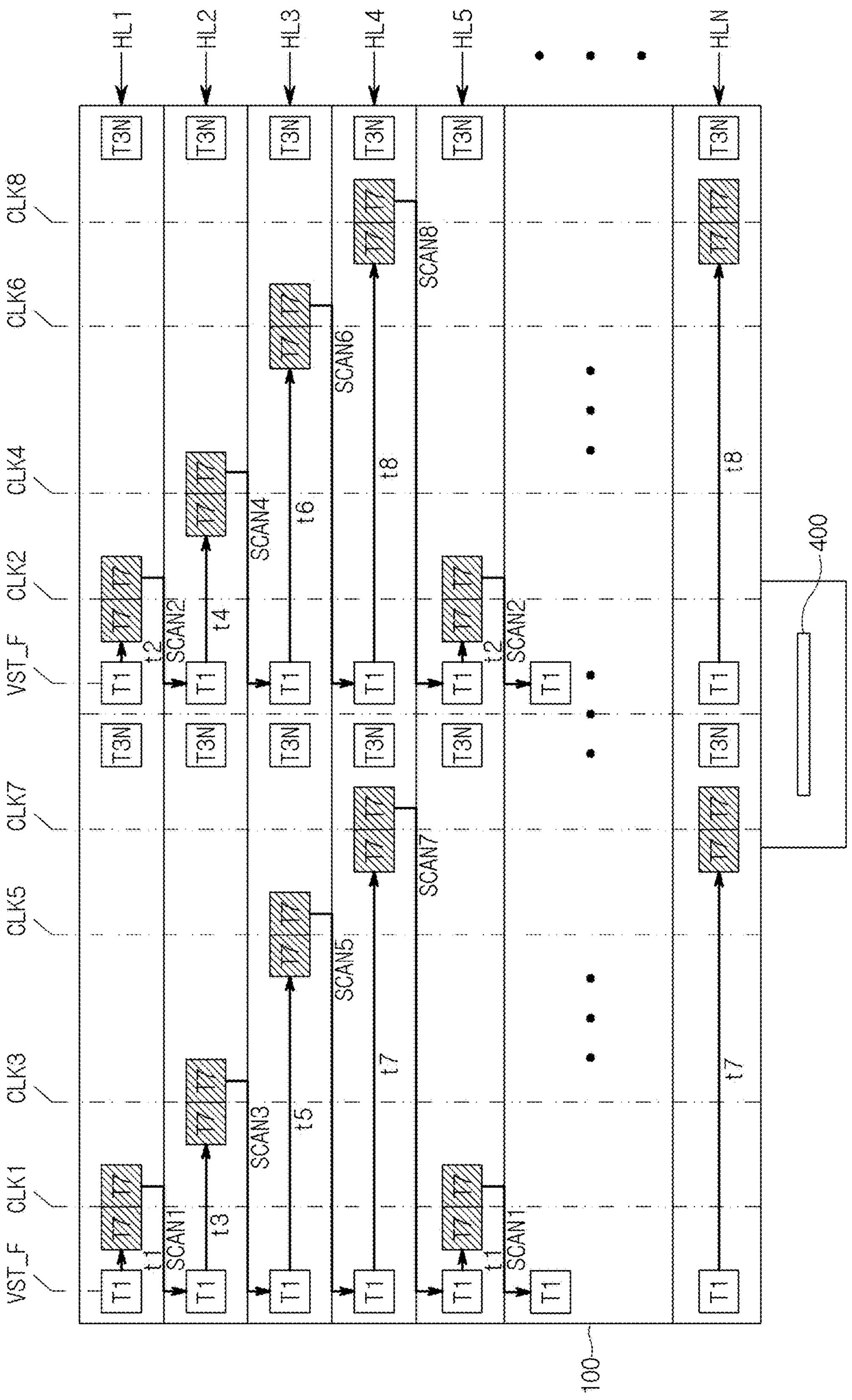
FIG. 12 is a layout diagram showing a distance from a transistor T1 to a transistor T7 of a gate driver and a time of signal transmission according to an embodiment of the present disclosure.

FIG. 12 is a layout diagram showing a distance from a transistor T1 to a transistor T7 of a gate driver and a time of signal transmission according to an embodiment of the present disclosure.

In the horizontal lines HLs, the transistor T1 of the first gate driver GD1 and second gate driver GD2 may be disposed on the leftmost side, and the transistor T3N may be disposed on the rightmost side.

As shown in FIGS. 7 and 12, when the gate drivers GD1 and GD2 are located on the first horizontal line HL1, the transistor T1 disposed on the leftmost side may apply the front-stage voltage FWD to the Q node in response to the forward start signal VST_F. Here, the front-stage voltage FWD may be set to the same level as the gate low voltage VGL. The respective clock signal wires (or lines) may be arranged and/or may extend in parallel to the data lines.

During the forward operation, the transistor T1 may discharge the Q node to the front-stage voltage FWD. In this case, the transistor T7 may pull-down drive the N-th scan signal SCANN according to the N-th clock signal CLKN by discharging the Q node.

When the gate drivers GD1 and GD2 are located on the second horizontal line HL2 to the N-th horizontal line HL N, the transistor T1, which is disposed on the leftmost side, may apply the front stage voltage FWD to the Q node according to the scan signal SCAN supplied from the transistor T7 of the gate drivers GD1 and GD2 of a previous horizontal line HL. Here, the scan signal SCAN may be a signal output from the previous horizontal line HL in the forward direction.

As shown in FIG. 12, if a time for a signal to be transmitted from the transistor T1 to transistor T7 of the first gate driver GD1 of the first horizontal line HL1 is defined as T1, a time for a signal to be transmitted from the transistor T1 to transistor T7 of the first gate driver GD1 of the second horizontal line HL2 is defined as t3, a time for a signal to be transmitted from the transistor T1 to transistor T7 of the first gate driver GD1 of the third horizontal line HL3 is defined as t5, and a time for a signal to be transmitted from the transistor T1 to transistor T7 of the first gate driver GD1 of the fourth horizontal line HL4 is defined as t7, the t1 to t7 times may be defined as $t1<t3<t5<t7$.

In this case, the time of signal transmission increases from the previous horizontal line HL N−1 to the next horizontal line HL N, so an output deviation may increase. If the output deviation increases, defective horizontal lines of the display panel 100 may be recognized.

As shown in FIG. 12, if a time for a signal to be transmitted from the transistor T1 to transistor T7 of the second gate driver GD2 of the first horizontal line HL1 is defined as t2, a time for a signal to be transmitted from the transistor T1 to transistor T7 of the second gate driver GD2 of the second horizontal line HL2 is defined as t4, a time for a signal to be transmitted from the transistor T1 to transistor T7 of the second gate driver GD2 of the third horizontal line HL3 is defined as t6, and a time for a signal to be transmitted from the transistor T1 to transistor T7 of the second gate driver GD2 of the fourth horizontal line HL4 is defined as t8, the t2 to t8 times may be defined as t2<t3<t6<t8.

In this case, the time of signal transmission increases from the previous horizontal line HL N−1 to the next horizontal line HL N, so an output deviation may increase. If the output deviation increases, defective horizontal lines of the display panel 100 may be recognized.

Figure 13:
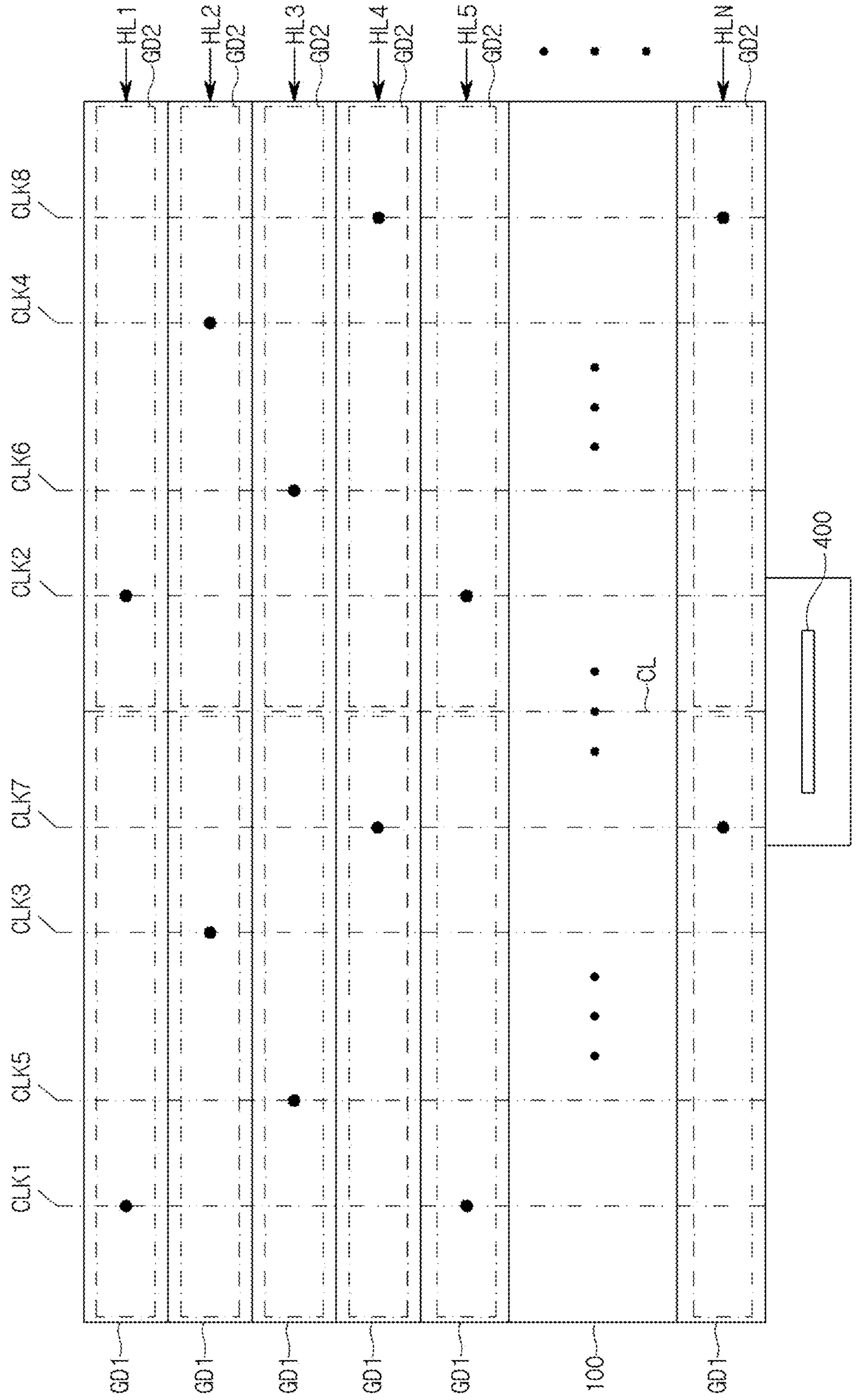
FIG. 13 is a layout diagram showing a clock signal and gate driver according to a first embodiment of the present disclosure.

FIG. 13 is a layout diagram showing a clock signal and gate driver according to a first embodiment of the present disclosure.

As shown in FIG. 13, the first gate driver GD1 and second gate driver GD2 may be disposed on the left and right sides of the center line CL of the display panel 100, respectively, in one horizontal line HL. A plurality of the first gate drivers GD1 and a plurality of the second gate drivers GD2 may be provided, respectively one for each horizontal line.

The first clock signal CLK1 to eighth clock signal CLK 8 may be disposed in the order of a first clock signal CLK1, a fifth clock signal CLK5, a third clock signal CLK3, a seventh clock signal CLK7, a second clock signal CLK2, a sixth clock signal CLK6, a fourth clock signal CLK4, and an eighth clock signal CLK8, respectively. The respective wires may be arranged and/or extend in parallel to the data lines.

The first clock signal CLK1, fifth clock signal CLK5, third clock signal CLK3, and seventh clock signal CLK7 may be supplied to the left side of the center line CL of the display panel 100. For example, the first clock signal CLK1 may be supplied to the first gate driver GD1 of the first horizontal line HL1, the fifth clock signal CLK5 may be supplied to the first gate driver GD1 of the third horizontal line HL3, the third clock signal CLK3 may be supplied to the first gate driver GD1 of the second horizontal line HL2, and the seventh clock signal CLK7 may be supplied to the first gate driver GD1 of the fourth horizontal line HL4.

The first clock signal CLK1, fifth clock signal CLK5, third clock signal CLK3, and seventh clock signal CLK7 may be periodically supplied to the first gate driver GD1 for each of the four horizontal lines HLs. For example, the first clock signal CLK1 may be supplied to the first gate line GD1 of the first horizontal line HL1 and fifth horizontal line HL5.

In addition, the second clock signal CLK2, sixth clock signal CLK6, fourth clock signal CLK4, and eighth clock signal CLK8 may be supplied to the right side of the center line CL of the display panel 100. For example, the second clock signal CLK2 may be supplied to the second gate driver GD2 of the first horizontal line HL1, the sixth clock signal CLK6 may be supplied to the second gate driver GD2 of the third horizontal line HL3, the fourth clock signal CLK4 may be supplied to the second gate driver GD2 of the second horizontal line HL2, and the eighth clock signal CLK8 may be supplied to the second gate driver GD2 of the fourth horizontal line HL4.

The second clock signal CLK2, sixth clock signal CLK6, fourth clock signal CLK4, and eighth clock signal CLK8 may be periodically supplied to the second gate driver GD2 for each of the four horizontal lines HLs. For example, the second clock signal CLK2 may be supplied to the second gate line GD2 of the first horizontal line HL1 and fifth horizontal line HL5.

Figure 14:
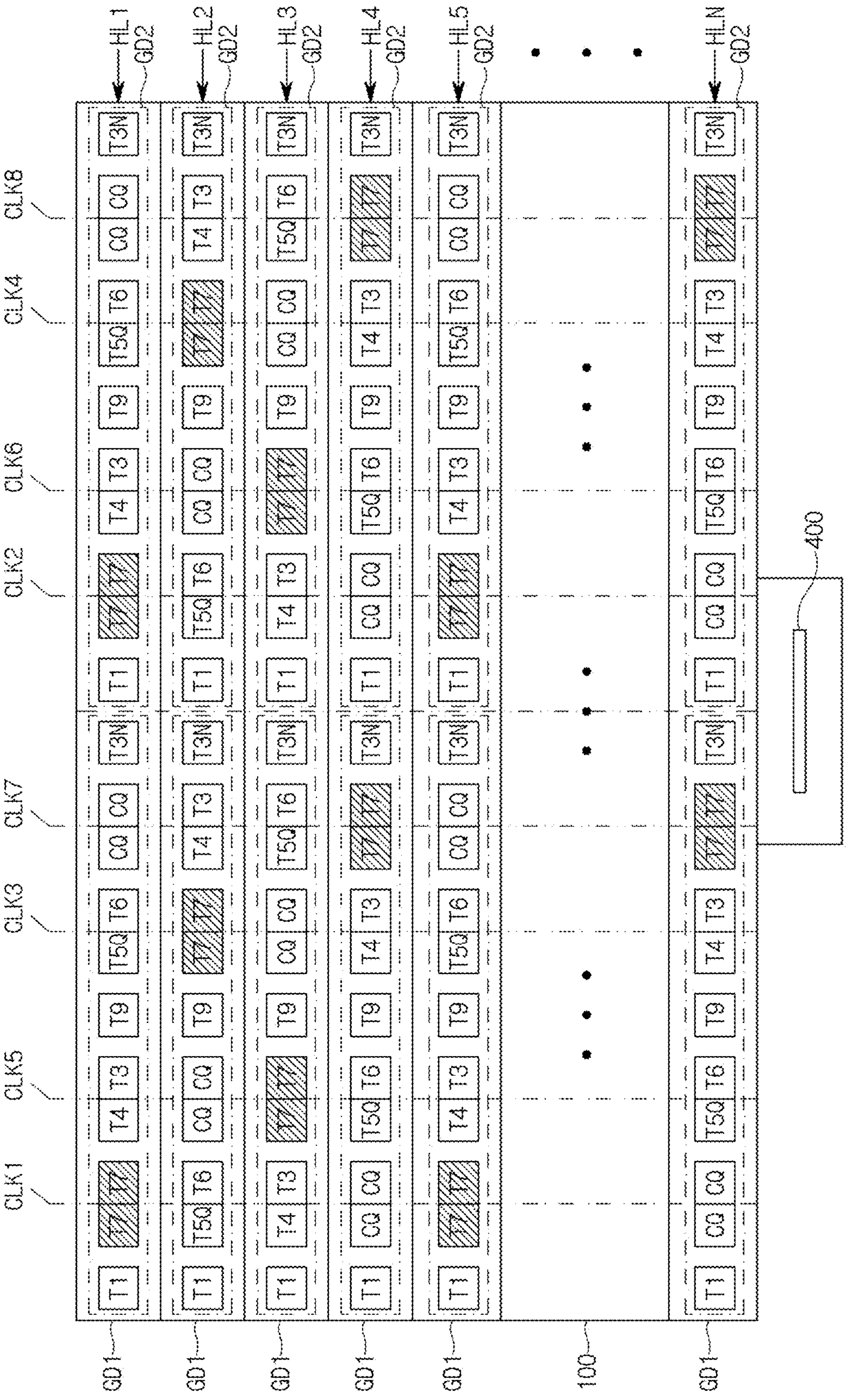
FIG. 14 is a layout diagram showing transistors of a gate driver according to the first embodiment of the present disclosure.

FIG. 14 is a layout diagram showing transistors of a gate driver according to the first embodiment of the present disclosure.

As shown in FIGS. 7 and 14, in the first horizontal line HL1, the first gate driver GD1 and second gate driver GD2 may be disposed in the order of a transistor T1, a transistor T7, a transistor T4, a transistor T3, a transistor T9, a transistor T5Q, a transistor T6, a transistor CQ, and a transistor T3N, respectively.

In the second horizontal line HL2, the first gate driver GD1 and second gate driver GD2 may be disposed in the order of the transistor T1, the transistor T5Q, the transistor T6, the transistor CQ, the transistor T9, the transistor T7, the transistor T4, the transistor T3, and the transistor T3N, respectively.

In the third horizontal line HL3, the first gate driver GD1 and second gate driver GD2 may be disposed in the order of the transistor T1, the transistor T4, the transistor T3, the transistor T7, the transistor T9, the transistor CQ, the transistor T5Q, the transistor T6, and the transistor T3N, respectively.

In the fourth horizontal line HL4, the first gate driver GD1 and second gate driver GD2 may be disposed in the order of the transistor T1, the transistor CQ, the transistor T5Q, the transistor T6, the transistor T9, the transistor T4, the transistor T3, the transistor T7, and the transistor T3N, respectively.

The arrangement order of the transistors of the first gate driver GD1 and second gate driver GD2 may be repeated in a period of four horizontal lines HLs.

As shown in FIGS. 7 and 14, the transistor T7 of the first gate driver GD1 may receive the first clock signal CLK1 at the first horizontal line HL1 and generate the first scan signal SCAN1. In addition, the transistor T7 of the second gate driver GD2 may receive the second clock signal CLK2 at the first horizontal line HL1 and generate the second scan signal SCAN2.

The transistor T7 of the first gate driver GD1 may receive the third clock signal CLK3 at the second horizontal line HL2 and generate the third scan signal SCAN3. In addition, the transistor T7 of the second gate driver GD2 may receive the fourth clock signal CLK4 at the second horizontal line HL2 and generate the fourth scan signal SCAN4.

The transistor T7 of the first gate driver GD1 may receive the fifth clock signal CLK5 at the third horizontal line HL3 and generate the fifth scan signal SCAN5. In addition, the transistor T7 of the second gate driver GD2 may receive the sixth clock signal CLK6 at the third horizontal line HL3 and generate the sixth scan signal SCAN6.

The transistor T7 of the first gate driver GD1 may receive the seventh clock signal CLK7 at the fourth horizontal line HL4 and generate the seventh scan signal SCAN7. In addition, the transistor T7 of the second gate driver GD2 may receive the eighth clock signal CLK8 at the fourth horizontal line HL4 and generate the eighth scan signal SCAN8.

The clock signal CLK received by the transistor T7 of the first and second gate drivers GD1 and GD2 on the horizontal line HL may be repeated in a period of four horizontal lines HLs.

Figure 15:
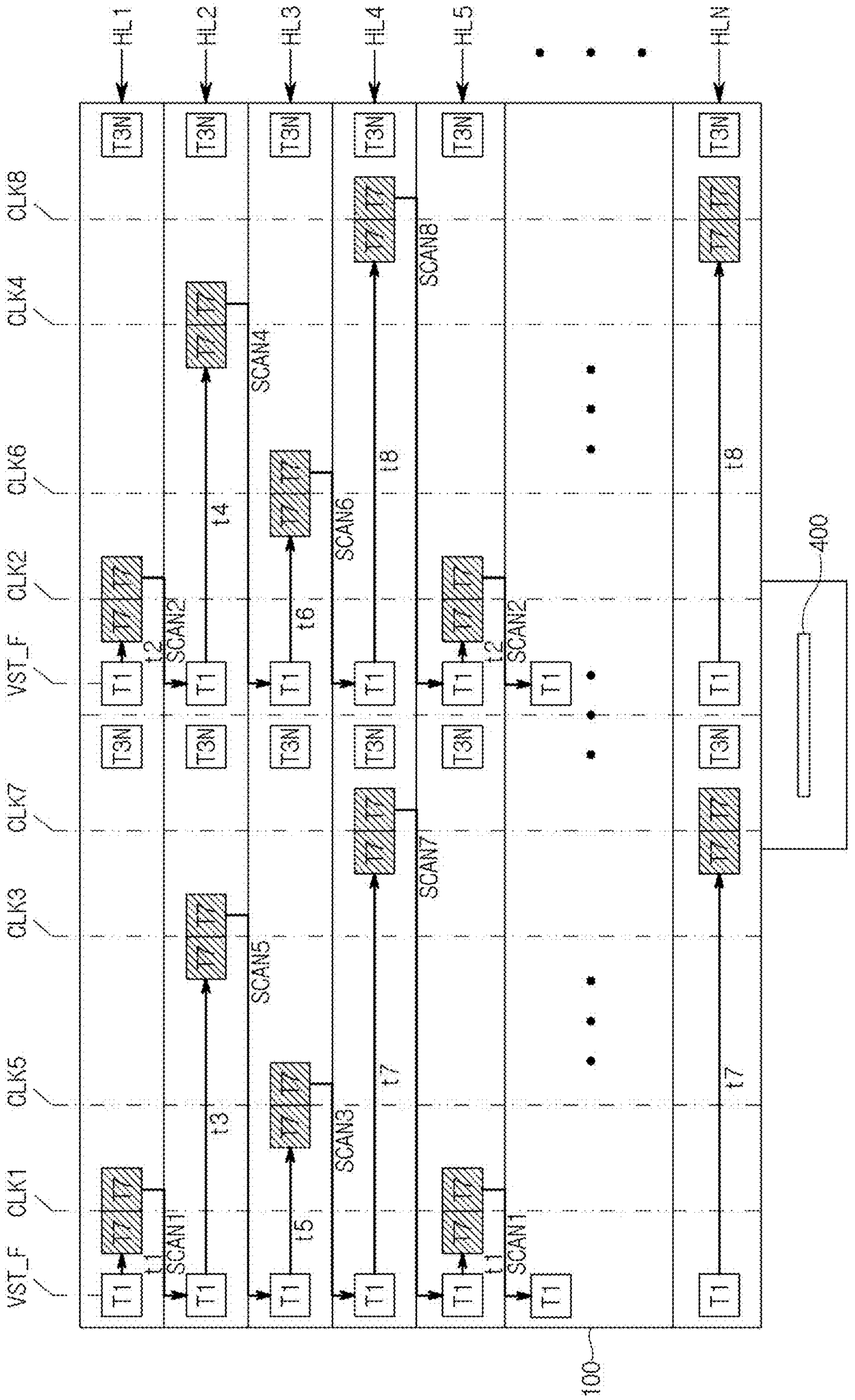
FIG. 15 is a layout diagram showing a distance from a transistor T1 to a transistor T7 of a gate driver and a time of signal transmission according to a first embodiment of the present disclosure.

FIG. 15 is a layout diagram showing a distance from a transistor T1 to a transistor T7 of a gate driver and a time of signal transmission according to a first embodiment of the present disclosure.

In the horizontal lines HLs, the transistor T1 of the first gate driver GD1 and second gate driver GD2 may be disposed on the leftmost side, and the transistor T3N may be disposed on the rightmost side.

As shown in FIGS. 7 and 15, when the gate drivers GD1 and GD2 are located on the first horizontal line HL1, the transistor T1 disposed on the leftmost side may apply the front-stage voltage FWD to the Q node in response to the forward start signal VST_F. Here, the front-stage voltage FWD may be set to the same level as the gate low voltage VGL. The wire supplying the forward start signal VST_F and the wire supplying the reverse start signal VST_B may be arranged and/or extend in parallel to the data lines.

During the forward operation, the transistor T1 may discharge the Q node to the front-stage voltage FWD. In this case, the transistor T7 may pull-down drive the N-th scan signal SCANN according to the N-th clock signal CLKN by discharging the Q node.

When the gate drivers GD1 and GD2 are located on the second horizontal line HL2 to the N-th horizontal line HL N, the transistor T1, which is disposed on the leftmost side, may apply the front-stage voltage FWD to the Q node according to the scan signal SCAN supplied from the transistor T7 of the gate drivers GD1 and GD2 of a previous horizontal line HL. Here, the scan signal SCAN may be a signal output from the previous horizontal line HL in the forward direction.

As shown in FIG. 15, if a time for a signal to be transmitted from the transistor T1 to transistor T7 of the first gate driver GD1 of the first horizontal line HL1 is defined as t1, a time for a signal to be transmitted from the transistor T1 to transistor T7 of the first gate driver GD1 of the second horizontal line HL2 is defined as t3, a time for a signal to be transmitted from the transistor T1 to transistor T7 of the first gate driver GD1 of the third horizontal line HL3 is defined as t5, and a time for a signal to be transmitted from the transistor T1 to transistor t7 of the first gate driver GD1 of the fourth horizontal line HL4 is defined as T7, the t1 to t7 times may be defined as t1<t5<t3<t7.

In this case, the time of signal transmission decreases from the previous horizontal line HL N−1 to the next horizontal line HL N, so an output deviation may decrease. In other words, a difference between the time of (T3-T1) and the time of (T3-T5) may become small, and a difference between the time of (T7-T5) and the time of (T7-T1) may become small. As the output deviation decreases, defective horizontal lines of the display panel 100 may be improved.

As shown in FIG. 15, if a time for a signal to be transmitted from the transistor T1 to transistor T7 of the second gate driver GD2 of the first horizontal line HL1 is defined as t2, a time for a signal to be transmitted from the transistor T1 to transistor T7 of the second gate driver GD2 of the second horizontal line HL2 is defined as t4, a time for a signal to be transmitted from the transistor T1 to transistor T7 of the second gate driver GD2 of the third horizontal line HL3 is defined as t6, and a time for a signal to be transmitted from the transistor T1 to transistor T7 of the second gate driver GD2 of the fourth horizontal line HL4 is defined as t8, the t2 to t8 times may be defined as t2<t6<t4<t8.

In this case, the time of signal transmission decreases from the previous horizontal line HL N−1 to the next horizontal line HL N, so an output deviation may decrease. In other words, a difference between the time of (T4-T2) and the time of (T4-T6) may become small, and a difference between the time of (T8-T6) and the time of (T8-T2) may become small. As the output deviation decreases, defective horizontal lines of the display panel 100 may be improved.

Figure 16:
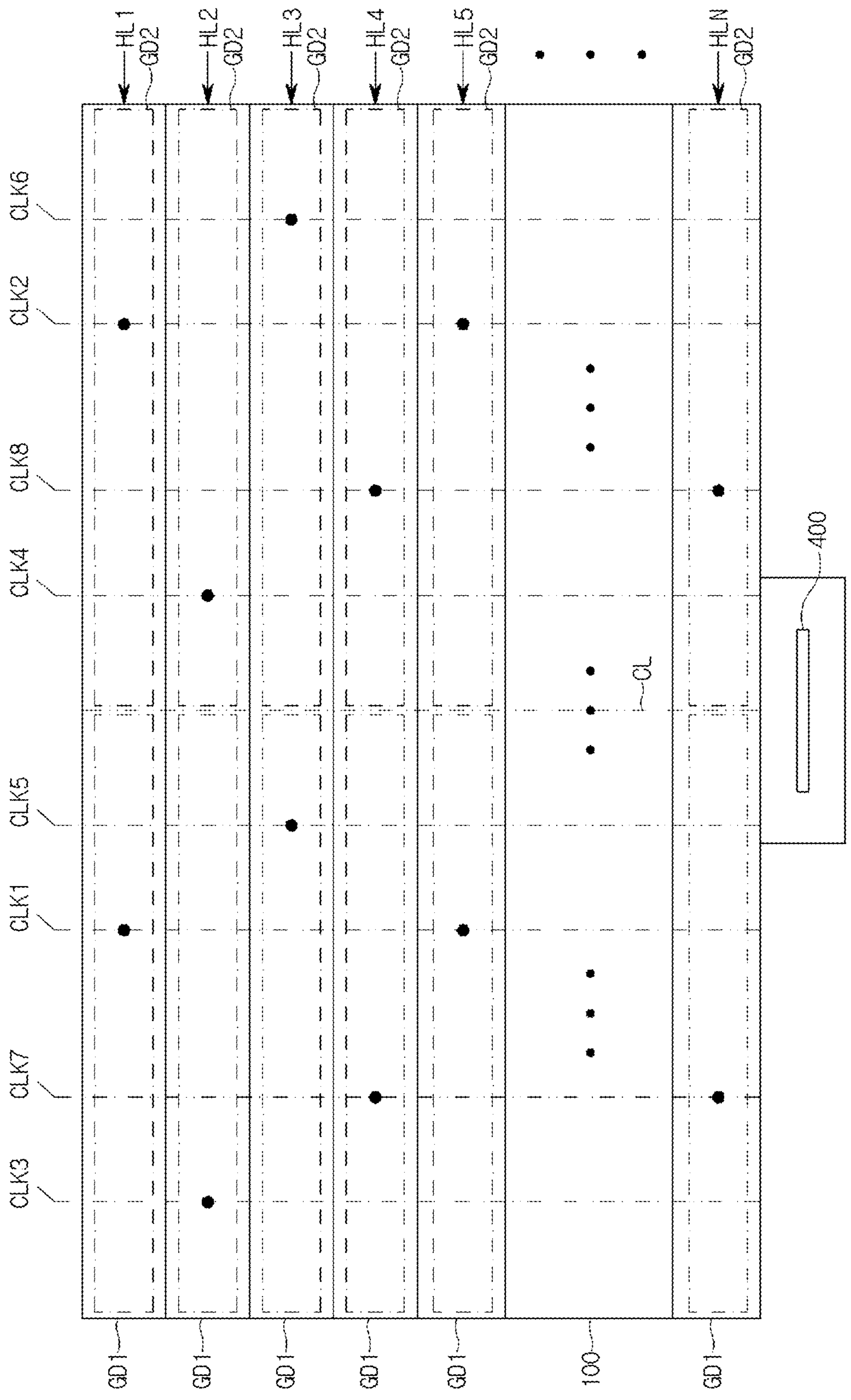
FIG. 16 is a layout diagram showing a clock signal and gate driver according to a second embodiment of the present disclosure.

FIG. 16 is a layout diagram showing a clock signal and gate driver according to a second embodiment of the present disclosure.

As shown in FIG. 16, the first gate driver GD1 and second gate driver GD2 may be disposed on the left and right sides of the center line CL of the display panel 100, respectively, in one horizontal line HL. A plurality of the first gate drivers GD1 and a plurality of the second gate drivers GD2 may be provided, respectively one for each horizontal line.

The first clock signal CLK1 to eighth clock signal CLK 8 may be disposed in the order of a third clock signal CLK3, a seventh clock signal CLK7, a first clock signal CLK1, a fifth clock signal CLK5, a fourth clock signal CLK4, an eighth clock signal CLK8, a second clock signal CLK2, and a sixth clock signal CLK6, respectively. The respective wires may be arranged and/or extend in parallel to the data lines.

The third clock signal CLK3, seventh clock signal CLK7, first clock signal CLK1, and fifth clock signal CLK5 may be supplied to the left side of the center line CL of the display panel 100. For example, the third clock signal CLK3 may be supplied to the first gate driver GD1 of the first horizontal line HL1, the seventh clock signal CLK7 may be supplied to the first gate driver GD1 of the fourth horizontal line HL4, the first clock signal CLK1 may be supplied to the first gate driver GD1 of the first horizontal line HL1, and the fifth clock signal CLK5 may be supplied to the first gate driver GD1 of the third horizontal line HL3.

The third clock signal CLK3, seventh clock signal CLK7, first clock signal CLK1, and fifth clock signal CLK5 may be periodically supplied to the first gate driver GD1 for each of the four horizontal lines HLs. For example, the first clock signal CLK1 may be supplied to the first gate line GD1 of the first horizontal line HL1 and fifth horizontal line HL5.

In addition, the fourth clock signal CLK4, eighth clock signal CLK8, second clock signal CLK2, and sixth clock signal CLK6 may be supplied to the right side of the center line CL of the display panel 100. For example, the fourth clock signal CLK4 may be supplied to the second gate driver GD2 of the second horizontal line HL2, the eighth clock signal CLK8 may be supplied to the second gate driver GD2 of the fourth horizontal line HL4, the second clock signal CLK2 may be supplied to the second gate driver GD2 of the first horizontal line HL1, and the sixth clock signal CLK6 may be supplied to the second gate driver GD2 of the third horizontal line HL3.

The fourth clock signal CLK4, eighth clock signal CLK8, second clock signal CLK2, and sixth clock signal CLK6 may be periodically supplied to the second gate driver GD2 for each of the four horizontal lines HLs. For example, the second clock signal CLK2 may be supplied to the second gate line GD2 of the first horizontal line HL1 and fifth horizontal line HL5.

Figure 17:
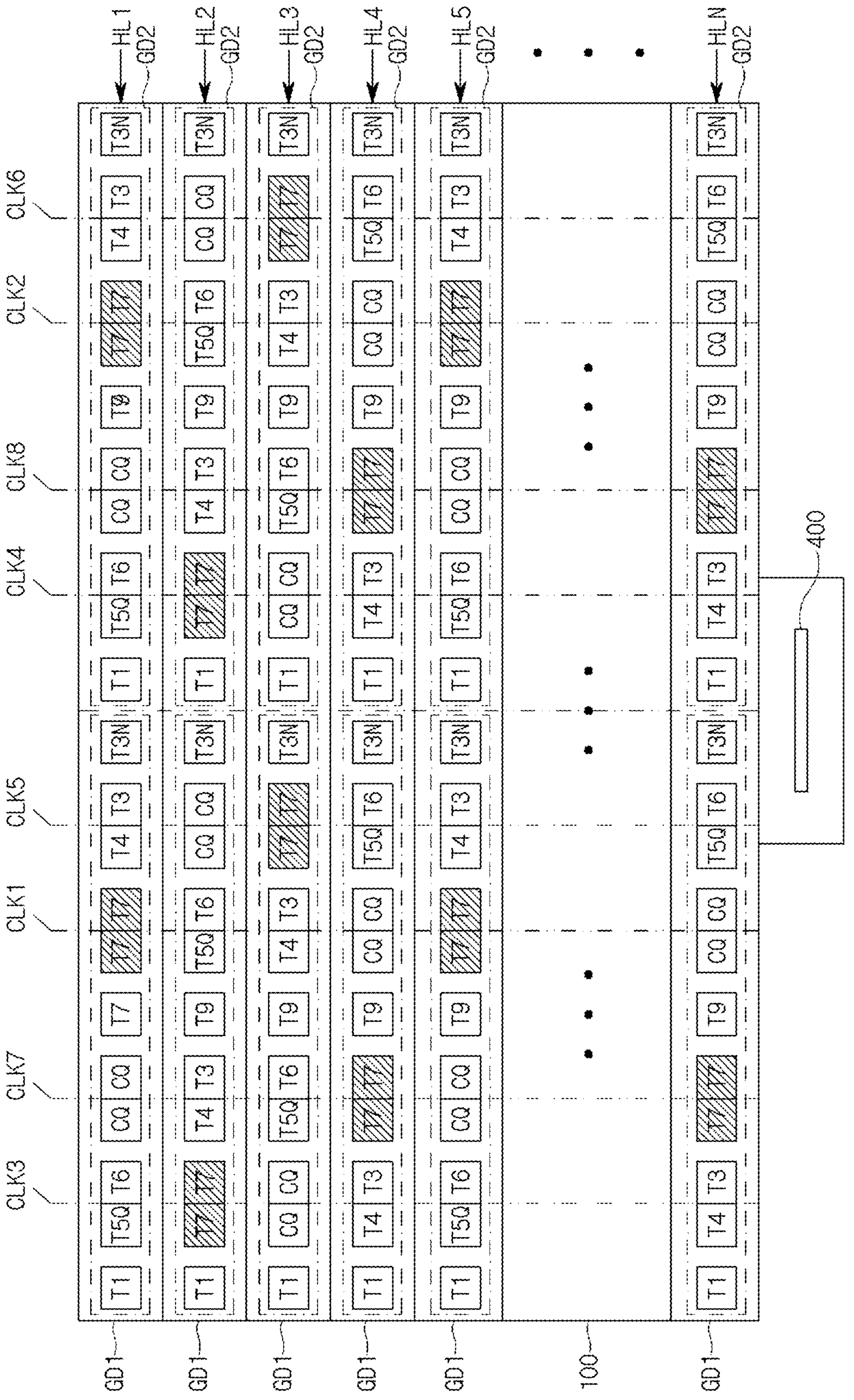
FIG. 17 is a layout diagram showing transistors of a gate driver according to a second embodiment of the present disclosure.

FIG. 17 is a layout diagram showing transistors of a gate driver according to a second embodiment of the present disclosure.

As shown in FIGS. 7 and 17, in the first horizontal line HL1, the first gate driver GD1 and second gate driver GD2 may be disposed in the order of a transistor T1, a transistor T5Q, a transistor T6, a transistor CQ, a transistor T9, a transistor T7, a transistor T4, a transistor T3, and a transistor T3N, respectively.

In the second horizontal line HL2, the first gate driver GD1 and second gate driver GD2 may be disposed in the order of the transistor T1, the transistor T7, the transistor T4, the transistor T3, the transistor T9, the transistor T5Q, the transistor T6, the transistor CQ, and the transistor T3N, respectively.

In the third horizontal line HL3, the first gate driver GD1 and second gate driver GD2 may be disposed in the order of the transistor T1, the transistor CQ, the transistor T5Q, the transistor T6, the transistor T9, the transistor T4, the transistor T3, the transistor T7, and the transistor T3N, respectively.

In the fourth horizontal line HL4, the first gate driver GD1 and second gate driver GD2 may be disposed in the order of the transistor T1, the transistor T4, the transistor T3, the transistor T7, the transistor T9, the transistor CQ, the transistor T5Q, the transistor T6, and the transistor T3N, respectively.

The arrangement order of the transistors of the first gate driver GD1 and second gate driver GD2 may be repeated in a period of four horizontal lines HLs.

As shown in FIGS. 7 and 17, the transistor T7 of the first gate driver GD1 may receive the first clock signal CLK1 at the first horizontal line HL1 and generate the first scan signal SCAN1. In addition, the transistor T7 of the second gate driver GD2 may receive the second clock signal CLK2 at the first horizontal line HL1 and generate the second scan signal SCAN2.

The transistor T7 of the first gate driver GD1 may receive the third clock signal CLK3 at the second horizontal line HL2 and generate the third scan signal SCAN3. In addition, the transistor T7 of the second gate driver GD2 may receive the fourth clock signal CLK4 at the second horizontal line HL2 and generate the fourth scan signal SCAN4.

The transistor T7 of the first gate driver GD1 may receive the fifth clock signal CLK5 at the third horizontal line HL3 and generate the fifth scan signal SCAN5. In addition, the transistor T7 of the second gate driver GD2 may receive the sixth clock signal CLK6 at the third horizontal line HL3 and generate the sixth scan signal SCAN6.

The transistor T7 of the first gate driver GD1 may receive the seventh clock signal CLK7 at the fourth horizontal line HL4 and generate the seventh scan signal SCAN7. In addition, the transistor T7 of the second gate driver GD2 may receive the eighth clock signal CLK8 at the fourth horizontal line HL4 and generate the eighth scan signal SCAN8.

The clock signal CLK received by the transistor T7 of the first and second gate drivers GD1 and GD2 on the horizontal line HL may be repeated in a period of four horizontal lines HLs.

Figure 18:
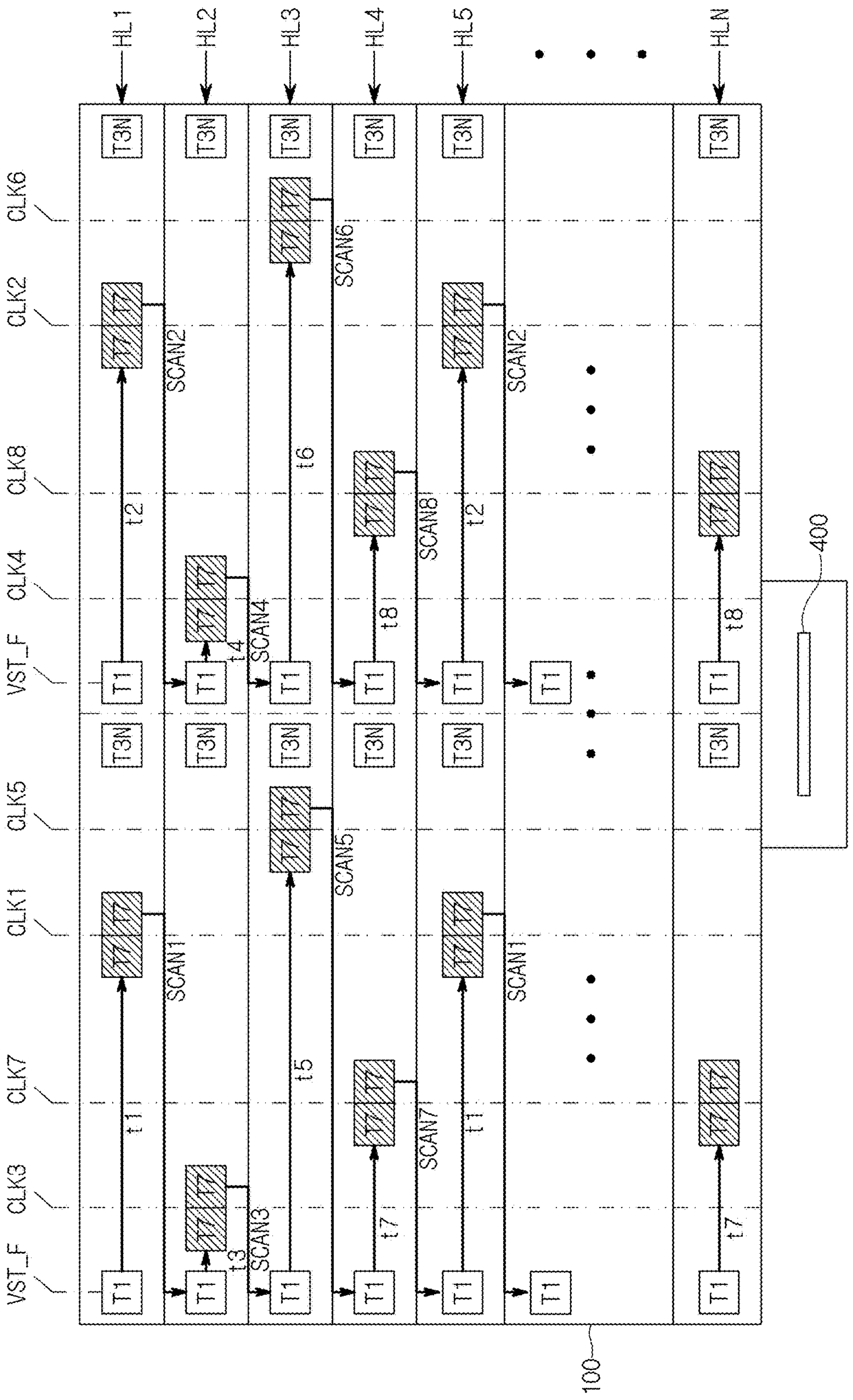
FIG. 18 is a layout diagram showing a distance from a transistor T1 to a transistor T7 of a gate driver and a time for signal arrival according to a second embodiment of the present disclosure.

FIG. 18 is a layout diagram showing a distance from a transistor T1 to a transistor T7 of a gate driver and a time for signal arrival according to a second embodiment of the present disclosure.

In the horizontal lines HLs, the transistor T1 of the first gate driver GD1 and second gate driver GD2 may be disposed on the leftmost side, and the transistor T3N may be disposed on the rightmost side.

As shown in FIGS. 7 and 18, when the gate drivers GD1 and GD2 are located on the first horizontal line HL1, the transistor T1 disposed on the leftmost side may apply the front-stage voltage FWD to the Q node in response to the forward start signal VST_F. Here, the front-stage voltage FWD may be set to the same level as the gate low voltage VGL. The wire supplying the forward start signal VST_F and the wire supplying the reverse start signal VST_B may be arranged and/or extend in parallel to the data lines.

During the forward operation, the transistor T1 may discharge the Q node to the front-stage voltage FWD. In this case, the transistor T7 may pull-down drive the N-th scan signal SCANN according to the N-th clock signal CLKN by discharging the Q node.

When the gate drivers GD1 and GD2 are located on the second horizontal line HL2 to the N-th horizontal line HL N, the transistor T1, which is disposed on the leftmost side, may apply the front-stage voltage FWD to the Q node according to the scan signal SCAN supplied from the transistor T7 of the gate drivers GD1 and GD2 of a previous horizontal line HL. Here, the scan signal SCAN may be a signal output from the previous horizontal line HL in the forward direction.

As shown in FIG. 18, if a time for a signal to be transmitted from the transistor T1 to transistor T7 of the first gate driver GD1 of the first horizontal line HL1 is defined as t1, a time for a signal to be transmitted from the transistor T1 to transistor T7 of the first gate driver GD1 of the second horizontal line HL2 is defined as t3, a time for a signal to be transmitted from the transistor T1 to transistor T7 of the first gate driver GD1 of the third horizontal line HL3 is defined as t5, and a time for a signal to be transmitted from the transistor T1 to transistor T7 of the first gate driver GD1 of the fourth horizontal line HL4 is defined as t7, the t1 to t7 times may be defined as $t3<t7<t1<t5$.

In this case, the time of signal transmission decreases from the previous horizontal line HL N−1 to the next horizontal line HL N, so an output deviation may decrease. In other words, a difference between the time of (t1-t3) and the time of (t5-t3) may become small, and a difference between the time of (t5-t7) and the time of (t1-t7) may become small. As the output deviation decreases, defective horizontal lines of the display panel 100 may be improved.

As shown in FIG. 18, if a time for a signal to be transmitted from the transistor T1 to transistor T7 of the second gate driver GD2 of the first horizontal line HL1 is defined as t2, a time for a signal to be transmitted from the transistor T1 to transistor T7 of the second gate driver GD2 of the second horizontal line HL2 is defined as t4, a time for a signal to be transmitted from the transistor T1 to transistor T7 of the second gate driver GD2 of the third horizontal line HL3 is defined as t6, and a time for a signal to be transmitted from the transistor T1 to transistor T7 of the second gate driver GD2 of the fourth horizontal line HL4 is defined as t8, the t2 to t8 times may be defined as $t4<t8<t2<t6$.

In this case, the time of signal transmission decreases from the previous horizontal line HL N−1 to the next horizontal line HL N, so an output deviation may decrease. In other words, a difference between the time of (t4-t2) and the time of (t4-t6) may become small, and a difference between the time of (t8-t6) and the time of (t8-t2) may become small. As the output deviation decreases, defective horizontal lines of the display panel 100 may be improved.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

The micro LED display apparatus according to embodiments can stably drive a gate driver within a GIA circuit.

What is claimed is:

1. A micro LED display apparatus, comprising:

a display panel on which a plurality of pixel arrays and a plurality of clock wires are disposed; and a gate in active (GIA) circuit configured to provide a scan signal to the pixel arrays, wherein the GIA circuit comprises a plurality of stages, wherein each stage of the plurality of stages comprises a first transistor connected to a corresponding clock wire among the plurality of clock wires, and wherein a position of the first transistor within the each stage varies according to a position of the corresponding clock wire to which the first transistor is connected such that the first transistor is vertically aligned with the corresponding clock wire.

2. The micro LED display apparatus of claim 1, wherein:

each stage of the plurality of stages further comprises a second transistor to which a forward start signal node is connected; and the second transistor is disposed according to the forward start signal node.

3. The micro LED display apparatus of claim 1, wherein:

each stage of the plurality of stages further comprises a third transistor to which a reverse start signal node is connected; and the third transistor is disposed according to the reverse start signal node.

4. The micro LED display apparatus of claim 1, wherein the GIA circuit comprises:

a first gate driver configured to provide a first scan signal to the pixel arrays; and a second gate driver configured to provide a second scan signal to the pixel arrays.

5. The micro LED display apparatus of claim 4, wherein each stage of the first gate driver and the second gate driver further comprises:

a fourth transistor including a gate electrode connected to a QB node, a source electrode connected to a gate high voltage node, and a drain electrode connected to an N-th scan signal node; and the first transistor including a gate electrode connected to a Q node, a source electrode connected to the N-th scan signal node, and a drain electrode connected to an N-th clock signal node.

6. The micro LED display apparatus of claim 5, wherein each stage of the first gate driver and the second gate driver further comprises a capacitor disposed between the N-th scan signal node and the Q node.

7. The micro LED display apparatus of claim 4, wherein a pulse width of the second scan signal is shorter than a pulse width of the first scan signal, and a pulse width for applying a data voltage is longer than the pulse width of the first scan signal.

8. The micro LED display apparatus of claim 1, wherein the display panel comprises a first GIA region, a second GIA region, and a third GIA region.

9. A display panel, comprising:

a plurality of pixel arrays;

a plurality of clock wires; and a gate in active (GIA) circuit configured to provide a scan signal to the pixel arrays, wherein the GIA circuit comprises a plurality of stages, wherein each stage of the plurality of stages comprises a first transistor connected to a corresponding clock wire among the plurality of clock wires, and wherein a position of the first transistor within the each stage varies according to a position of the corresponding clock wire to which the first transistor is connected such that the first transistor is vertically aligned with the corresponding clock wire.

10. The display panel of claim 9, wherein:

each stage of the plurality of stages further comprises a second transistor to which a forward start signal node is connected; and the second transistor is disposed according to the forward start signal node.

11. The display panel of claim 9, wherein:

each stage of the plurality of stages further comprises a third transistor to which a reverse start signal node is connected; and the third transistor is disposed according to the reverse start signal node.

12. The display panel of claim 9, wherein the GIA circuit comprises:

a first gate driver configured to provide a first scan signal to the pixel arrays; and a second gate driver configured to provide a second scan signal to the pixel arrays.

13. The display panel of claim 12, wherein each stage of the first gate driver and the second gate driver further comprises:

a fourth transistor including a gate electrode connected to a QB node, a source electrode connected to a gate high voltage node, and a drain electrode connected to an N-th scan signal node; and the first transistor including a gate electrode connected to a Q node, a source electrode connected to the N-th scan signal node, and a drain electrode connected to an N-th clock signal node.

14. The display panel of claim 13, wherein each stage of the first gate driver and the second gate driver further comprises a capacitor disposed between the N-th scan signal node and the Q node.

15. The display panel of claim 12, wherein a pulse width of the second scan signal is shorter than a pulse width of the first scan signal, and a pulse width for applying a data voltage is longer than the pulse width of the first scan signal.

16. A display apparatus, comprising:

first pixels and a first gate driver disposed along a first line;

second pixels and a second gate driver disposed along a second line adjacent to the first line; and third pixels and a third gate driver disposed along a third line adjacent to the second line, wherein:

the first, second and third pixels and the first, second and third gate drivers are disposed in an active area of a display panel;

each of the first, second and third gate drivers comprises a first transistor for receiving a start signal, and a second transistor for providing a scan signal to respective one or more pixels;

a first distance is between the first transistor and the second transistor of the first gate driver;

a second distance is between the first transistor and the second transistor of the second gate driver;

a third distance is between the first transistor and the second transistor of the third gate driver; and the first transistors and the second transistors of the first, second and third gate drivers are arranged such that: the second distance is greater than the first distance, and the third distance is less than the second distance; or the second distance is less than the first distance, and the third distance is greater than the second distance.

17. The display apparatus of claim 16, wherein:

a time for a signal to be transmitted from the first transistor to the second transistor of the first gate driver is a first time;

a time for a signal to be transmitted from the first transistor to the second transistor of the second gate driver is a second time; and a time for a signal to be transmitted from the first transistor to the second transistor of the third gate driver is a third time, and wherein:

the second time is greater than the first time, and the third time is less than the second time; or the second time is less than the first time, and the third time is greater than the second time.

18. The display apparatus of claim 16, wherein:

the display panel comprises a first gate in active (GIA) region, a second GIA region, and a third GIA region disposed in the active area;

each of the first, second and third GIA regions comprises the first, second and third pixels and the first, second and third gate drivers; and a GIA circuit comprises the first, second and third gate drivers of the first, second and third GIA regions.

19. The display apparatus of claim 18, wherein the first, second and third gate drivers within the first GIA region are disposed at a center line of the first GIA region or disposed on a left or right side abutting the center line.

20. The display apparatus of claim 16, further comprising a plurality of clock wires, wherein:

each of the second transistors of the first, second and third gate drivers is connected to a respective one of the plurality of clock wires; and the plurality of clock wires are arranged in parallel to data lines.

* * * * *